US007605607B2

(12) United States Patent
Ng

(10) Patent No.: US 7,605,607 B2
(45) Date of Patent: Oct. 20, 2009

(54) STATE MACHINE AND SYSTEM AND METHOD OF IMPLEMENTING A STATE MACHINE

(76) Inventor: Chan Wai Ng, Flat B, 7th Floor, Block 9, Villa Athena, Ma On Shan (HK)

( * ) Notice: Subject to any disclaimer, the term of this patent is extended or adjusted under 35 U.S.C. 154(b) by 125 days.

(21) Appl. No.: 11/608,558

(22) Filed: Dec. 8, 2006

(65) Prior Publication Data
US 2008/0136448 A1   Jun. 12, 2008

(51) Int. Cl.
*H03K 19/173* (2006.01)
(52) U.S. Cl. ....................................................... 326/46
(58) Field of Classification Search .................... 326/46
See application file for complete search history.

(56) References Cited

U.S. PATENT DOCUMENTS

| | | | |
|---|---|---|---|
| 4,663,545 A | 5/1987 | Pumo et al. | |
| 5,369,647 A | 11/1994 | Kreifels et al. | |
| 5,555,213 A | 9/1996 | DeLong | |
| 5,627,797 A | 5/1997 | Hawkins | |
| 5,640,398 A | 6/1997 | Carr et al. | |
| 5,712,826 A | 1/1998 | Wong et al. | |
| 5,925,135 A | 7/1999 | Trieu et al. | |
| 6,266,780 B1 | 7/2001 | Grundvig et al. | |
| 6,453,425 B1 * | 9/2002 | Hede et al. | 713/501 |

FOREIGN PATENT DOCUMENTS

| | | |
|---|---|---|
| CN | 1567205 | 1/2005 |
| CN | 1758612 | 4/2006 |
| EP | 0 591 593 A1 | 4/1994 |
| EP | 0 629 933 A1 | 12/1994 |
| GB | 2 221 328 A | 1/1990 |
| WO | 2006015625 | 2/2006 |

OTHER PUBLICATIONS

Written Opinion issued by PCT on Nov. 15, 2007 in connection with corresponding PCT International Application No. PCT/CN2007/002328. 5 pages.
International Search Report CS/05/0123 dated Oct. 21, 2005 (Australian Patent Office).

* cited by examiner

*Primary Examiner*—Rexford N Barnie
*Assistant Examiner*—Thienvu V Tran
(74) *Attorney, Agent, or Firm*—Ostrolenk Faber LLP

(57) ABSTRACT

A system and method for implementing a state machine including a plurality of states, the state machine configured to transition from a present state to a next state in response to input. One embodiment of the system includes a plurality of state elements, each of the plurality of state elements representing one of the plurality of states of the state machine, each of the plurality of state elements receiving an on signal, an off signal, and a synchronizing signal, each of the state elements outputting a state value, each of the plurality of state elements further including a logic element to store a temporary state value, wherein the state value is updated by the temporary state value in response to the synchronizing signal, and wherein the state value of each of the plurality of state elements is synchronously updated in response to the synchronizing signal.

45 Claims, 29 Drawing Sheets

STATE MACHINE AND SYSTEM AND METHOD OF IMPLEMENTING A STATE MACHINE

FIELD OF THE INVENTION

The present invention relates generally to a state machine, and more specifically, a system and method of implementing a state machine.

BACKGROUND OF THE INVENTION

A state machine is a model that includes states and transitions between the various states, the transitions usually occurring as a result of a particular input or change in conditions.

Logic design and analysis often requires the design of state machines. The design and analysis process generally includes modeling binary output variables as functions of binary input variables. For instance, binary output variables representative of the next state of the machine may be modeled as mathematical transforms, or functions, of binary input variables. However, when the number of input variables or the number of logic states is large, conventional state machine design methods result in a large permutation of inputs and states, making the design and testing of the state machine difficult and complex. For example, using some conventional state machine design methods, a state table is generally used to illustrate all possible permutations of states and inputs. In these conventional state machine design methods, a state machine with a variable of m flip-flops and a variable of n inputs would require a state table having $2^{(m+n)}$ rows. For example, in one conventional design method, a state machine with 18 inputs and 9 states, implemented using 4 flip flops, would require a state table having $2^{(18+4)}=4194304$ rows. The resulting state machine may be difficult to test and may suffer from erratic, unpredictable operation.

Accordingly, there is a present need for a state machine and a method and system of designing and implementing a state machine that addresses these and other shortcomings of existing systems and methods.

SUMMARY OF THE INVENTION

According to one embodiment of the present invention, a system for implementing a state machine including a plurality of states, the state machine configured to transition from a present state to a next state in response to input, is disclosed. The system includes a plurality of state elements, each of the plurality of state elements representing one of the plurality of states of the state machine, each of the plurality of state elements receiving an on signal, an off signal, and a synchronizing signal, each of the state elements outputting a state value, each of the plurality of state elements further including a logic element to store a temporary state value, wherein the state value is updated by the temporary state value in response to the synchronizing signal; and wherein the state value of a first one of the plurality of state elements is true, and wherein the one of the plurality of state elements having a true state value is a present state element, and wherein a second one of the plurality of state elements is a next state element, and the state value of the next state element is false, and wherein the present state element corresponds to the present state of the state machine, and the next state element corresponds to the next state of the state machine, and wherein the state value of the next state element changes from false to true in response to an assertion of the on signal of the next state element, and wherein the state value of the present state element changes from true to false in response to an assertion of the off signal of the present state element; and wherein the state value of each of the plurality of state elements is synchronously updated in response to the synchronizing signal.

According to another embodiment of the present invention, a system for implementing a state machine including a plurality of states, the state machine configured to transition from a present state to a next state in response to input, is disclosed. The system includes a plurality of state elements, each of the plurality of state elements representing one of the plurality of states of the state machine, each of the plurality of state elements receiving an on signal, an on enable signal, an off signal, an off enable signal, and a synchronizing signal, each of the state elements outputting a state value, each of the plurality of state elements further including a latch to store and output a temporary state value, wherein the state value is updated by the temporary state value in response to the synchronizing signal; and wherein the state value of a first one of the plurality of state elements is true, and wherein the one of the plurality of state elements having a true value is a present state element, and wherein a second one of the plurality of state elements is a next state element, and the state value of the next state element is false, and wherein the present state element corresponds to the present state of the state machine, and the next state element corresponds to the next state of the state machine, and wherein the latch of the next state element is set in response to the state value of the present state element, one or more inputs, and an assertion of the on enable signal; and wherein the state value of the next state element is updated by the latch output of the next state element in response to the synchronizing signal.

According to yet another embodiment of the present invention, a system for implementing a state machine including a plurality of states, the state machine configured to transition from a present state to a next state in response to input, is disclosed. The system includes a plurality of state elements, each of the plurality of state elements including at least one logic element and a storage element coupled to the at least one logic element, the storage element receives a synchronizing signal, the storage element configured to store and output a state value of the state element, wherein each of the plurality of state elements represents one of the plurality of states of the state machine; wherein the at least one logic element of each of the plurality of state elements receives an on signal, an off signal, and an on enable signal, and wherein the state value selectively alternates between an ON value and an OFF value in response to the input, and wherein the ON value indicates an active state element and the OFF value indicates an inactive state of the state element, and wherein a first one of the plurality of state elements is active and represents a present state element and wherein a second one of the plurality of state elements is inactive and represents a next state and wherein the present state element corresponds to the present state of the state machine, wherein the next state element corresponds to the next state of the state machine; and wherein the on signal represents one or more on conditions for the associated state element, the one or more on conditions including a first logic combination including at least a state value of one of the plurality of state elements, one or more predetermined inputs, and the on enable signal.

According to yet another embodiment of the present invention, a system for implementing a state machine including a plurality of states, the state machine configured to transition from a present state to a next state in response to input, is disclosed. The system includes a plurality of state elements, each of the plurality of state elements representing one of the plurality of states of the state machine, and each of the state elements outputs a state value, each of the state elements including: a logic element, wherein the logic element receives an on signal, an on enable signal, an off signal, and an off enable signal, wherein the logic element latches and outputs a temporary state value; and a storage element coupled to the logic element, the storage element stores and outputs a state value, wherein the storage element receives the temporary state value from the logic element, and wherein the storage element receives a synchronizing signal having a periodic oscillating pulse having an successive plurality of rising edges and falling edges, and wherein the state value output of the storage element updates to the temporary state value at every falling edge of the synchronizing signal; and wherein one of the plurality of state elements is a present state element corresponding to the present state of the state machine, and one of the plurality of state elements is a next state element corresponding to the next state of the state machine, wherein the state value of the present state element is set to off upon receiving one or more predetermined inputs and the off enable signal of the present state element is asserted, and wherein the state value of the next state element is set to on upon receiving the one or more predetermined inputs and the on enable signal of the next state element is asserted.

According to yet another embodiment of the present invention, a state element logic system for implementing a state machine including a plurality of states, the state element logic system representing one of the plurality of states of the state machine, is disclosed. The state element logic system includes a logic element, wherein the logic element receives an on signal, an on enable signal, an off signal, and an off enable signal, wherein the logic element latches and outputs a temporary state value; and a storage element coupled to the logic element, the storage element stores and outputs a state value, wherein the storage element receives the temporary state value from the logic element, and wherein the storage element receives a synchronizing signal having a periodic oscillating pulse having an successive plurality of rising edges and falling edges, and wherein the state value output of the storage element updates to the temporary state value at every falling edge of the synchronizing signal, and wherein a change in the state value of the storage element to off is triggered when the off signal is true and the off signal is enabled by the off enable signal, and a change in the state value of the storage element to on is triggered when the on signal is true and the on signal is enabled by the on enable signal.

According to yet another embodiment of the present invention, a method of implementing a state machine having a plurality of states, the state machine transitioning from a present state to a next state in response to input, is disclosed. The method includes providing a state diagram, the state diagram defining a plurality of states, a plurality of state transitions, and one or more inputs, wherein each of the plurality of state transitions occurs in response to at least one of the one or more inputs; providing a plurality state elements, each of the plurality of state elements corresponding one-to-one to each of the plurality of states of the state diagram; generating a plurality of combinational on conditions and a plurality of combinational off conditions using the plurality of state transitions and the one or more inputs, wherein each of the plurality of states is associated with one of the plurality of combinational on conditions, and each of the plurality of states is associated with one of the plurality of combinational off conditions; and transitioning from the present state of the state machine to a next state of the state machine in response to the one of the one or more inputs satisfying the combinational off condition of the present state, and wherein the one of the one or more inputs satisfies the combinational on condition of the next state.

According to yet another embodiment of the present invention, a logic device for implementing a state machine including a plurality of states, the state machine configured to transition from a present state to a next state in response to input, is disclosed. The logic device includes a plurality of logic elements for representing the plurality of states of the state machine, each of the plurality of logic elements including a first combinational logic input and a second combinational logic input, wherein the first combinational logic input is an on signal and the second combinational logic input is an off signal, each of the plurality of logic elements further including a storage element that outputs a state value signal and receives a temporary state value signal and a synchronizing signal, wherein the state value signal updates in response to the synchronizing signal; and wherein the state value signal of a first one of the plurality of logic elements is true, and wherein the one of the plurality of logic elements having a true state value signal is a present state logic element, and wherein a second one of the plurality of logic elements is a next state logic state element and the state value signal of the next state element is false; and wherein a transition from a present state of the state machine to a next state of the state machine occurs when the state value signal of the present state logic element updates from true to false in response to input satisfying the second combinational logic input of the present state logic element, and the state value signal of the next state logic element updates from false to true in response to input satisfying the first combinational logic input of the next state logic element.

BRIEF DESCRIPTION OF THE DRAWINGS

These and other features, aspects, and advantages of the present invention will become better understood with regard to the following description and accompanying drawings where.

DETAILED DESCRIPTION

Figure 1:
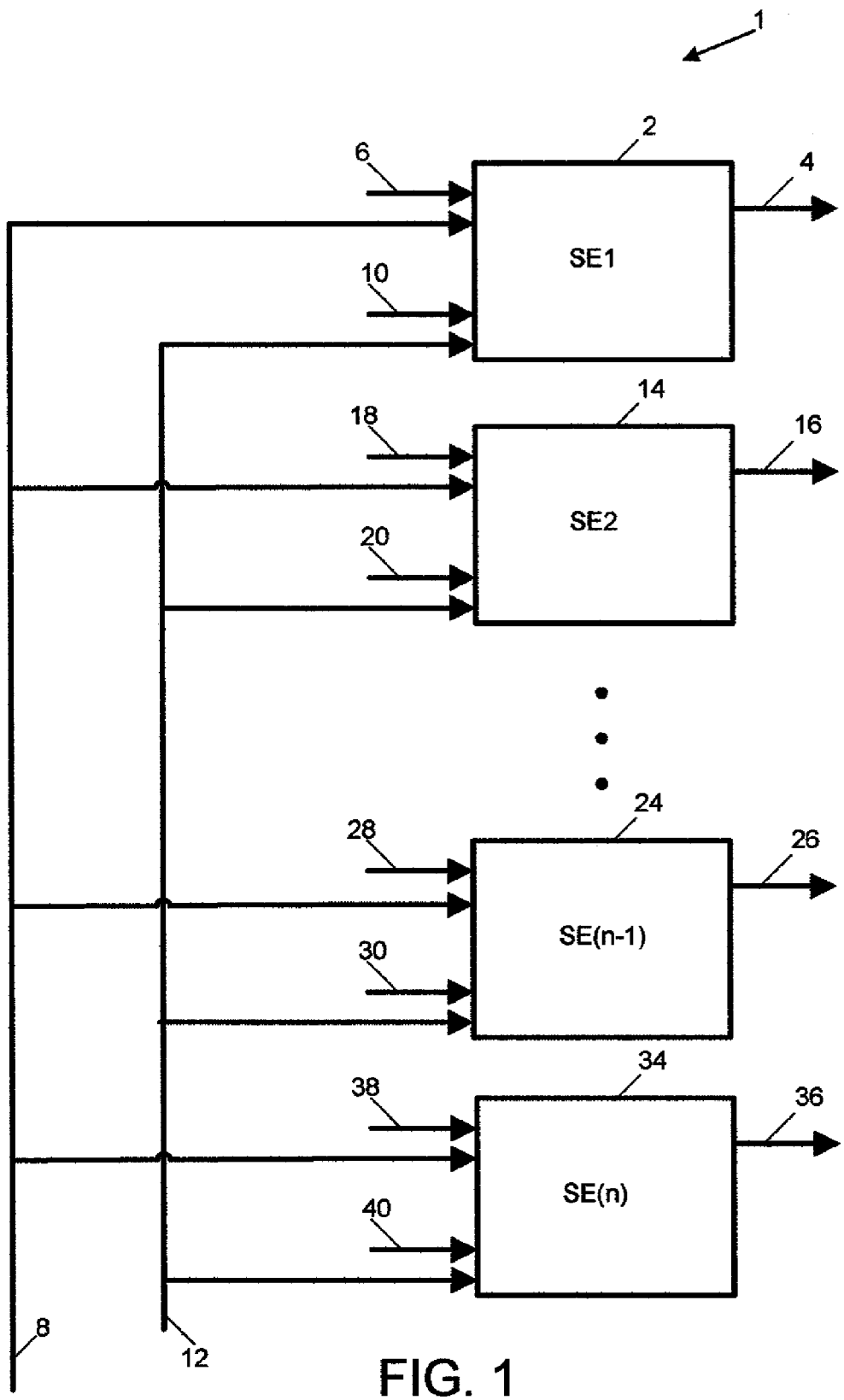
FIG. 1 is a block diagram of a state machine, in accordance with an embodiment of the present invention.

The detailed description sets forth below in connection with the appended drawings is intended as a description of example embodiments of the present invention and it is not intended to represent the only embodiments in which the present invention can be practiced. The embodiments described throughout this description are intended to serve as examples or illustrations of the present invention and should not necessarily be construed as preferred or advantageous over other embodiments. Any number of the described features and embodiments may be incorporated in any desired combination. The detailed description includes specific details for the purpose of providing a thorough understanding of the present invention. However, it will be apparent to those skilled in the art that the present invention may be practiced without these specific details.

In the following description, reference is made to the accompanying drawings in which specific embodiments of the invention are shown by way of illustration. It is to be understood that other embodiments may be used as structural and other changes may be made without departing from the scope of the present invention.

Generally, embodiments of the present invention are directed to methods and systems of designing and implementing state machines. Embodiments of the present invention may be used for designing and implementing synchronous state machines. However, asynchronous designs and methods may also be implemented in accordance with embodiments of the present invention. Embodiments of the invention are configured such that an appropriate input and a corresponding present state will switch on the next state of the state machine. The same input and a temporary next state, or the corresponding present state, will switch off the present state. Therefore, a transition from a present state to a next state may be effected. Embodiments of the present invention thereby improves state machine design when compared to conventional state machine design methods.

According to embodiments of the present invention, when a state diagram is given, a next state value is considered to be switched on (that is, active or logical 1) by the appropriate input combined with the corresponding present state, followed by the present state being switched off (that is, inactive or logical 0) by the same input and corresponding temporary next state, or the corresponding present state. In this way, very complex state machines can be designed, implemented, and tested thoroughly and therefore be very reliable.

When referring to the described embodiment, signals, inputs, state values, and other values may be referred to as binary signals, or having a binary characteristic, therefore having a value of either zero (0), which is considered to be "off," or one (1), which is considered to be "on." It should be appreciated that the terms "zero," "OFF," "false," and "logic 0," may be understood to have similar meaning and may be used interchangeably, and the terms "one," "ON," "true," and "logic 1" may be understood to have similar meaning and may be used interchangeably. Throughout the present description, positive logic is used. However, negative logic can also be used in the embodiments. The positive logic convention assigns a HIGH(H) voltage for logic 1 and LOW (L) voltage for logic 0. On the other hand, in the negative logic convention, a logic 1=LOW(L) voltage and logic 0=HIGH (H) voltage.

Figure 6:
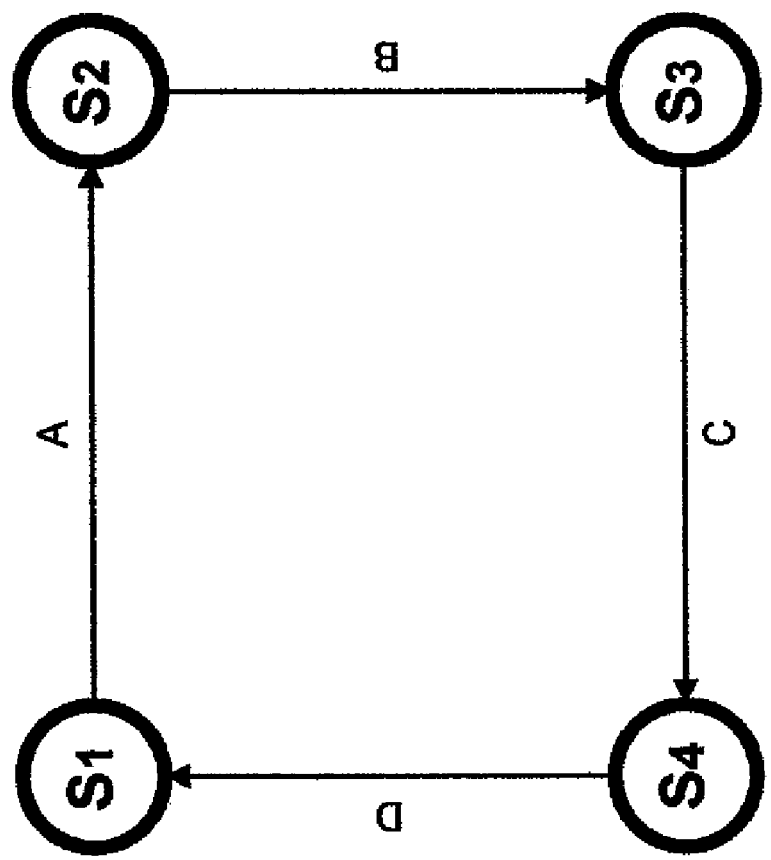
FIG. 6 is a state diagram of an example four-state state machine, in accordance with an embodiment of the present invention.

Throughout the present description, the term "Sn", where 'n' is an integer, is used to represent a state in the state machine. For example, referring to FIG. 6, FIG. 6 is a state diagram of an example four-state state machine, in accordance with an embodiment of the present invention. The state diagram 182 includes four states, S1, S2, S3, and S4. Four transitions are illustrated in the state diagram 182 that occur in response to inputs A, B, C, and D. Input A initiates the transition from S1 to S2, input B initiates the transition from S2 to S3, input C initiates the transition from S3 to S4, and input D initiates the transition from S4 to S1.

Referring now to the figures, FIG. 1 is a block diagram of a state machine, in accordance with an embodiment of the present invention. The state machine 1 generally includes a plurality of state elements ("SE"), identified as SE1 (2), SE2 (14), SE(n−1) (24), and SE(n) (34), where n is an integer. The ellipsis between SE2 (14) and SE(n−1) (24) is used to represent any number of SEs, such that any desired number of SEs may be included in the state machine 1. Each SE represents one state in the state machine. Therefore, a state machine with n different states would include n number of SEs. Each of the SEs has a state value. In one embodiment, the state elements are synchronous state elements generally synchronized by a single synchronizing signal which can be clock signal. However, the state elements may also be implemented in asynchronous configurations.

In the state machine 1 illustrated in FIG. 1, SE1 (2) includes input of an SE1 on signal 6, a first enable signal 8, an SE1 off signal 10, and a second enable signal 12. SE1 (2) includes an SE1 state value 4 output. SE2 (14) includes input of an SE2 on signal 18 and the first enable signal 8, an SE2 off signal 20 and the second enable signal 12. SE2 (14) includes an SE2 state value 16 output. SE(n−1) (24) includes input of an SE(n−1) on signal 28 and the first enable signal 8, SE(n−1) off signal 30 and the second enable signal 12. SE(n−1) (24) includes an SE(n−1) state value 26 output. SE(n) (34) includes input of an SE(n) on signal 38 and the first enable signal 8, an SE(n) off signal 40 and the second enable signal 12. SE(n) (34) includes an SE(n) state value 36 output.

The first enable signal 8 and the second enable signal 12 are described below with reference to specific implementations of the state machine. In one embodiment, the second enable signal 12 has a constant value of logic "1", or "on". In another embodiment, the second enable signal 12 is the same as the first enable signal 8, which may be a clock signal. Example clock signals are illustrated and described with reference to FIG. 5. In yet another embodiment, the second enable signal 12 is a second clock signal having a timing pulse that is different from the timing pulse of the first enable signal 8, which is illustrated and described with reference to FIG. 14.

Figure 7:
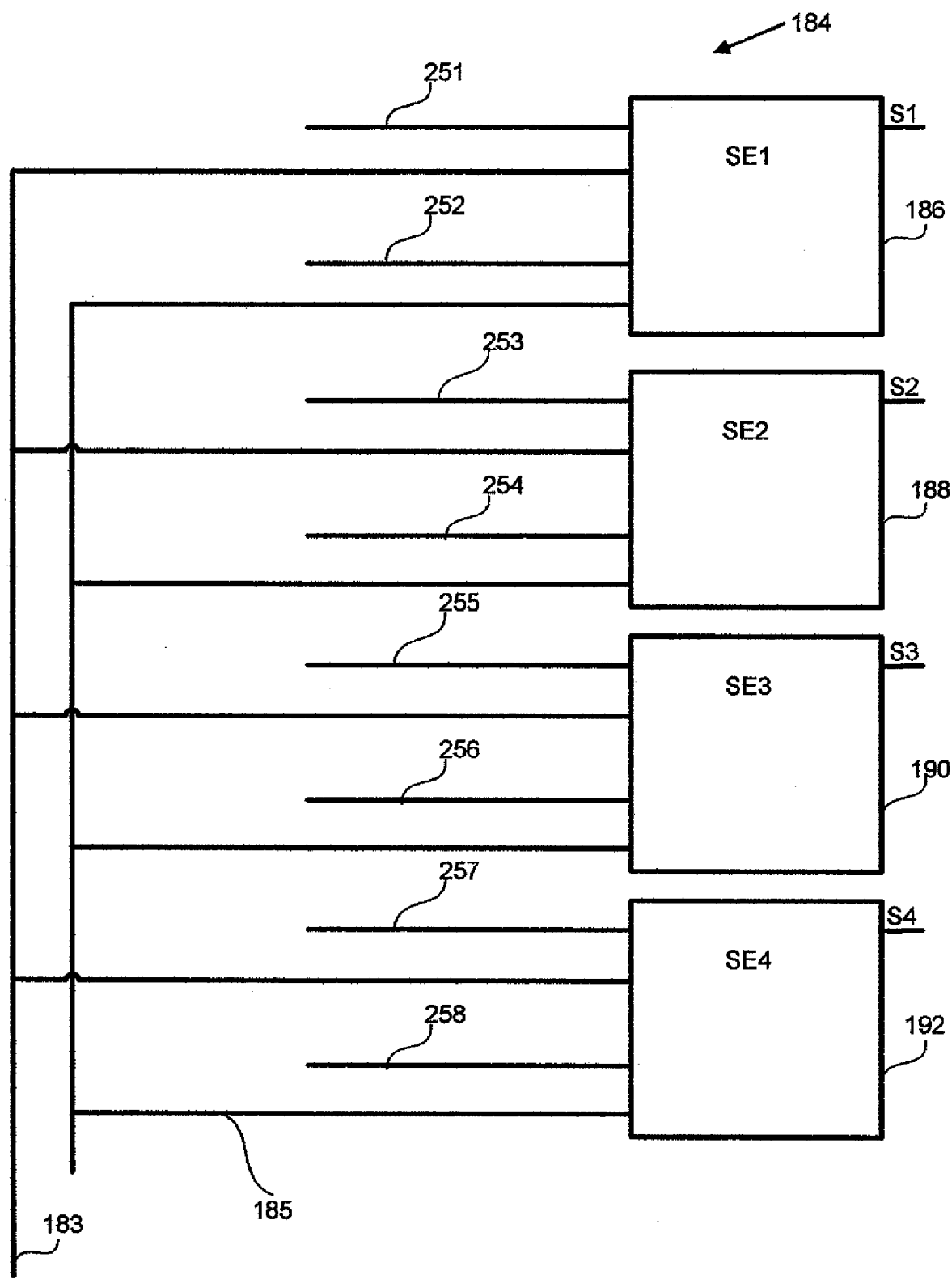
FIG. 7 is a block diagram of the state machine illustrated in FIG. 6, in accordance with an embodiment of the present invention.

For example, referring to FIG. 7, FIG. 7 is a block diagram 184 of the state machine illustrated in FIG. 6, in accordance with an embodiment of the present invention. The block diagram of FIG. 7 is one example implementation of the state machine illustrated by the state diagram of FIG. 6. Each of the SEs in FIG. 7 corresponds to one of the states illustrated in FIG. 6. For example, SE1 186 corresponds to state S1 of FIG. 6, SE2 188 corresponds to state S2 of FIG. 6, SE3 190 corresponds to state S3 of FIG. 6, and SE4 192 corresponds to state S4 of FIG. 6. Each of SE1, SE2, SE3, and SE4 outputs a state value, state value S1, state value S2, state value S3, and state value S4, respectively. If the state value of the SE is a logical "1", or "ON", then the active state, or present state, of the state machine will be the state corresponding to that particular SE. For example, if state value S1 is "ON", then state S1 is the active state. Each of the transitions of FIG. 6 corresponds to an input that is required to change the state values of the corresponding SEs in FIG. 7.

The input is received by each of the SEs in the form of an "on signal" or an "off signal," which may be considered a binary signal. The on conditions and off conditions of each of the SEs may be implemented using combinational logic such that the on conditions and off conditions may be evaluated as either being true or false. The "true" or "false" evaluation of the on conditions and off conditions may be sent to the SE as the on signal and off signal.

The SE1 186 receives an on signal 251 and an off signal 252. The SE2 188 receives an on signal 253 and an off signal 254. The SE3 190 receives an on signal 255 and an off signal 256. The SE4 192 receives an on signal 257 and an off signal 258. Each of the state elements SE1, SE2, SE3, and SE4 receives an on enable signal 183 and an off enable signal 185.

Figure 2A:
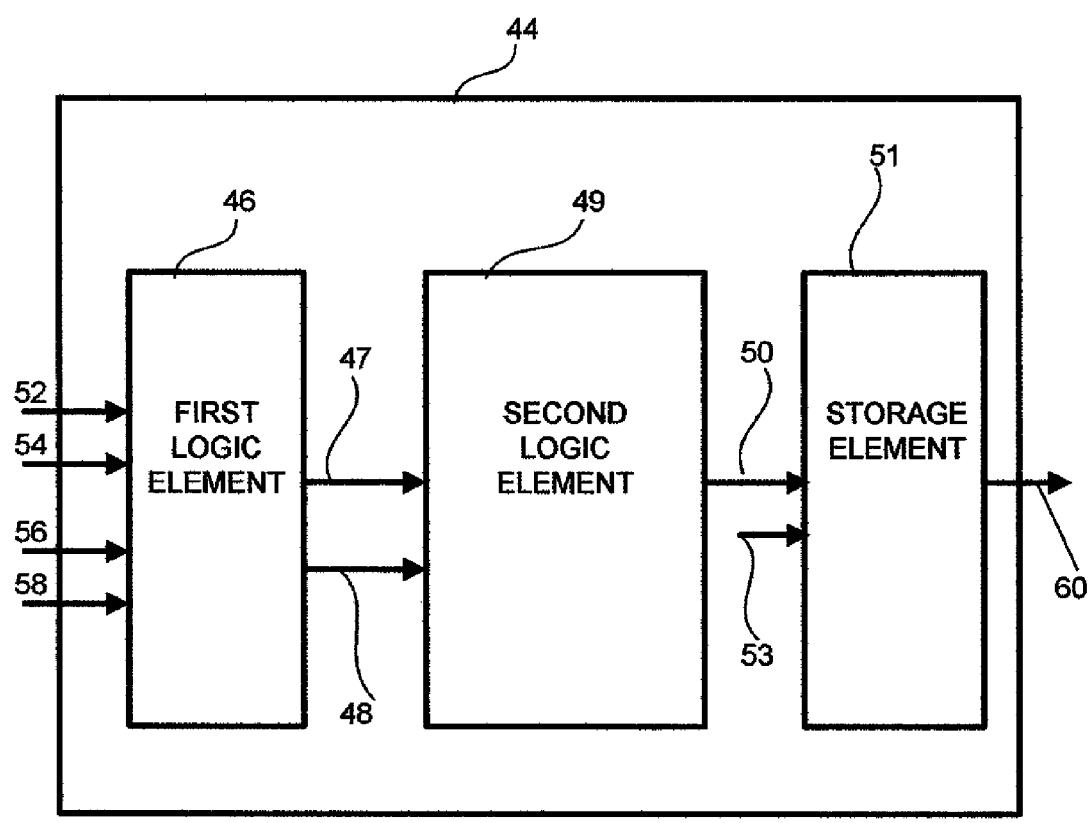
FIG. 2A is a block diagram of an example state element, in accordance with an embodiment of the present invention.

FIG. 2A is a block diagram of an example state element, in accordance with an embodiment of the present invention. The state element ("SE") 44 shown in FIG. 2A provides additional detail of the SEs shown in the state machine 1 illustrated in FIG. 1. Each SE may include an on signal input 52 and a first enable signal input 54, an off signal input 56 and a second enable signal input 58, and a state value 60 output. The SE 44 includes a first logic element 46, a second logic element 49, and a storage element 51. The first logic element receives the on signal 52, the first enable signal 54, the off signal 56, and the second enable signal 58. The first logic element 46 sends first and second signals 47, 48 to the second logic element 49. The second logic element 49 sends one or more signals 50 to the storage element 51. The storage element 51 stores and outputs the SE value 60. The storage element 51 may also receive a control input 53.

In embodiments of the present invention, the first enable signal 54 may be an on enable signal, which enables the on signal input 52, the second enable signal 58 may be an off enable signal, which enables the off signal input 56, and the control input 53 may receive a synchronizing signal that is used to update the storage element 51. While multiple signals may be described with reference to various embodiment of the present invention, it will be apparent that multiple signals, such as the on enable signal and the off enable signal, can be derived from a single signal, such as the synchronizing signal, using conventional techniques, for example, passing the synchronizing signal into a combination of appropriate logic gates and devices, thereby creating the necessary signals. For example, appropriate logic gates and devices may be used to split, delay, or otherwise manipulate a signal as necessary.

Figure 2B:
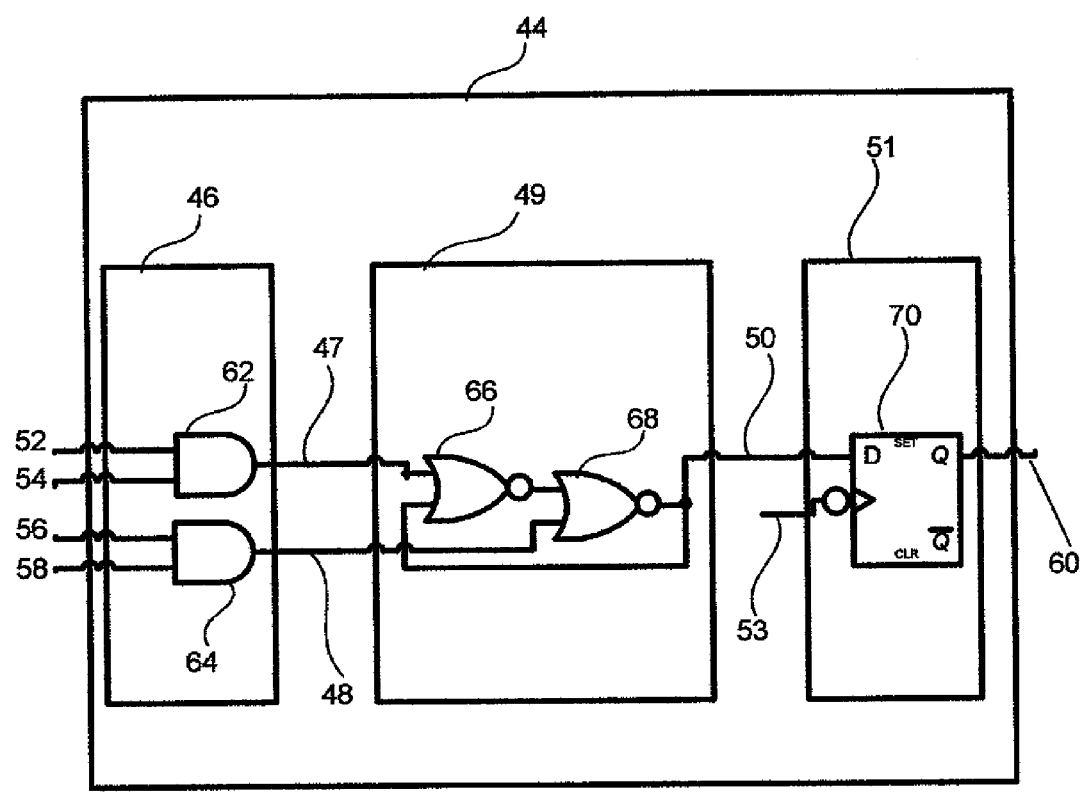
FIG. 2B is a block diagram of the state element shown in FIG. 2A, including example logic components, in accordance with an embodiment of the present invention.

Referring generally to FIG. 2B, a block diagram of the state element shown in FIG. 2A, including example logic components, is shown, in accordance with an embodiment of the present invention. In the illustrated embodiment, the first logic element 46 may include a pair of AND gates, the first AND gate 62 receiving the on signal 52 and the first enable signal 54, and the second AND gate 64 receiving the off signal 56 and the second enable signal 58. The second logic element 49 may include a NOR latch comprising a first NOR gate 66 and a second NOR gate 68. The first AND gate 62 sends the first signal 47, which is the set signal, to the first NOR gate 66, and the second AND gate 64 sends the second signal 48, which is the reset signal, to the second NOR gate 68. The storage element may include a D flip flop 70. The NOR latch output 50 is sent to the D flip flop 70. The D flip flop 70 may also receive the control input 53. The D flip flop 70 may store and output the SE value 60.

Figure 2C:
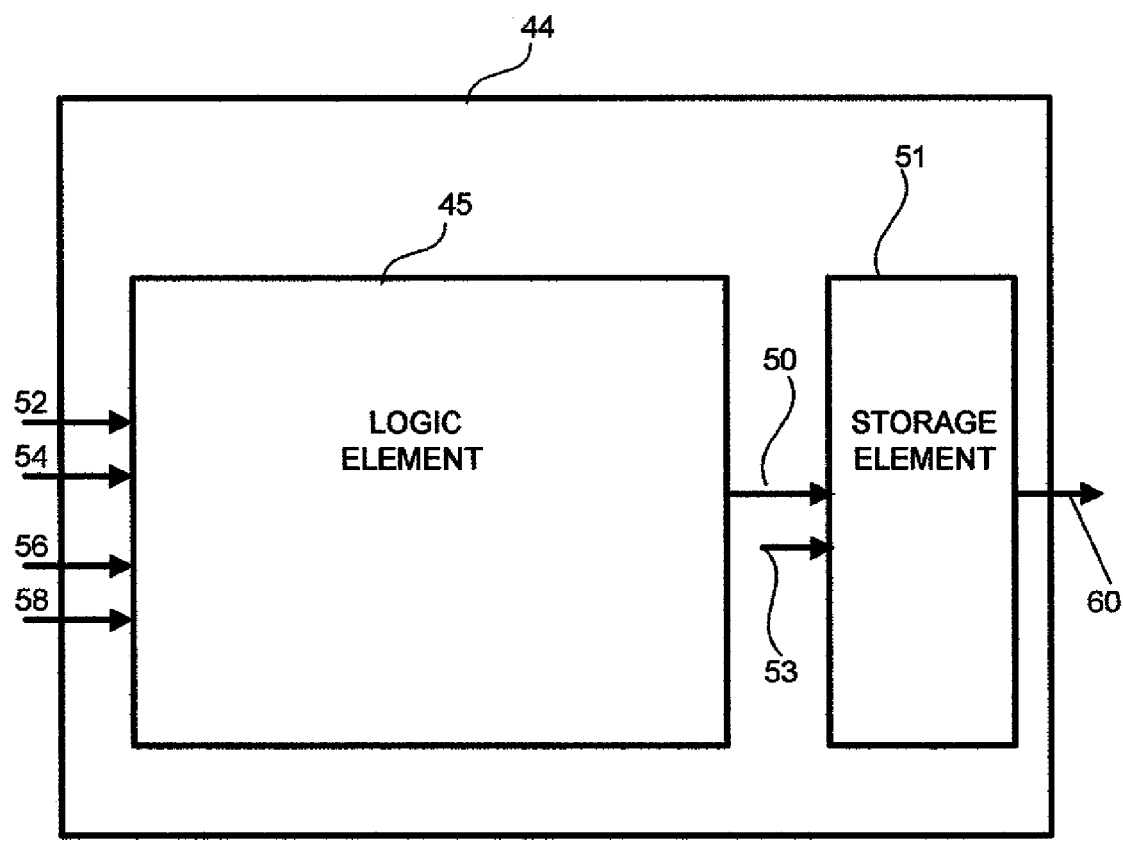
FIG. 2C is a block diagram of another example state element, in accordance with an embodiment of the present invention.

While the embodiment illustrated in FIG. 2A includes the first logic element 46 and the second logic element 49, the described operation may be performed using a single logic element including any suitable components and connections to perform the desired operation. Shown in FIG. 2C is a block diagram of another example state element having a single logic element 45. The other illustrated signals and elements are similar to those described with reference to FIG. 2A. In the illustrated embodiment, the logic element 45 performs combinational and latch operations. The logic element 45 receives an on signal 52, an on enable signal, an off signal 56, and an off enable signal. In one embodiment, the first enable signal 54 is the on enable signal and the second enable signal 58 is the off enable signal. The logic element 45 outputs a temporary state value signal, TSn, where n is the variable identifying the particular SE being referred to. The temporary state value signal is sent to a storage element. The storage element receives the temporary state value signal and also receives a synchronizing signal. When the synchronizing signal is present, or ON, the input temporary state value signal is passed to its output. The storage element outputs a state value Sn. When the synchronizing signal is not present, or OFF, the output of the storage element remains at its last value regardless of the changes of the input temporary state value signal. In one embodiment, the storage element output does not update until the next synchronizing signal is present, or ON.

During a state transition, the on signal and the on enable signal set and latch the temporary state value TS(next) of the "next state" state element to logic "1", where (next) is an identifier used to represent the state and state element corresponding to the "next state" of the state machine. The variable n is an identifier used to represent the particular state and state element corresponding to the "present state" of the state machine. The off signal and the off enable signal will reset and latch the temporary state value signal TSn of the "present state" state element to logic 0. When the synchronizing signal is next asserted, temporary state values TSn and TS(next) will pass to their respective storage element outputs, and TS(next) becomes the state value S(next) of the "next state" state element, and TSn becomes the state value Sn of the "present state" state element. The state value S(next), which is now logic 1, then represents the new "present state," and the state value Sn, which is now logic 0, then represents the "last state," thereby completing one state transition from a present state to a next state.

The logic elements illustrated and described are example logic elements and other suitable elements that perform a similar function may also be used. For example, other and different logic components, and different quantities of components, and other and different couplings among the various components may be used. The logic elements may be implemented using hardware, software, or a combination of hardware and software. While the logic elements are illustrated in a certain quantity and configuration, it can be appreciated that a different number of logic elements, possibly having a different configuration, can be used to achieve a similar result.

Figure 3:
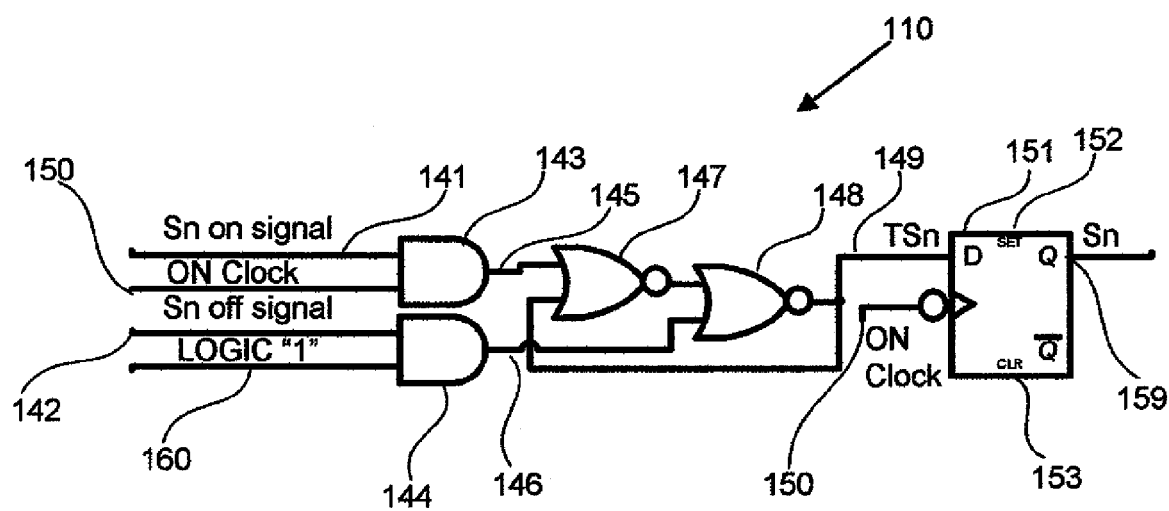
FIG. 3 is a logic diagram of a first embodiment of the state element, in accordance with an embodiment of the present invention.

FIG. 3 is a logic diagram of a first embodiment of the state element, in accordance with an embodiment of the present invention.

The first embodiment of a state element ("SE") 110 receives an ON clock input 150 as both the on enable signal and synchronizing signal and a logic "1" signal 160 as the off enable signal. SE 110 generally includes first and second AND gates 143, 144, a NOR latch constructed from first NOR gate 147 and second NOR gate 148, and a falling edge triggered D flip flop 151. The D flip flop has a temporary state input TSn 149, an ON clock input 150, which is the master synchronizing signal input, a D flip flop output Sn 159, a SET input 152, and a CLR input 153.

Each SE is used to represent one state in the state machine. The D flip flop output, Sn 159, is the state value, where "n" is a number identifying the SE and the corresponding state in the state machine.

The NOR latch operates as follows: when first NOR input 145 which is the set input is logic "1" and second NOR input 146 which is the reset input is logic "0", the latch output 149, which is also the TSn input 149, will give a logic "1". When the first NOR input 145 is logic "0" and the second NOR input 146 is logic "1", the output 149 will give a logic "0". When both the first NOR input 145 and second NOR input 146 are logic "0", the latch output 149 will remain at the last logic state. Both the first NOR input 145 and the second NOR input 146 are not allowed to be asserted simultaneously as logic "1".

The D flip flop operates as follows: a falling edge of ON clock 150 will set the output Sn 159 logically equal to TSn 149 and will remain at that logic state until next falling edge of the ON clock 150. For example, if TSn 149 is a logic "1" when a falling edge of ON clock 150 occurs then Sn 159 is a logic "1", and if TSn 149 is a logic "0" when a falling edge of ON clock 150 occurs then Sn 159 is a logic "0". For initialization of the state machine, the SET input 152 of one of the D flip flop of the SE representing the initial state will be asserted and then released once for initializing the initial state to logic "1". For the D flip flops of other SEs, representing other states the CLR input 153 will be asserted and then released once simultaneously with SET input 152 of the initial state SE in order to initialize their respective outputs 159 to logic "0".

The Sn on signal 141 corresponds to the switch-on condition of Sn implemented by the logical AND of both the input corresponding to the incoming transition and the state value of the associated state, which is the present state, that the transition to the state Sn, which is the next state, is coming from. For example, in the state diagram 182 of FIG. 6, for state S2 to be the next state, the switch-on condition is the presence of incoming input A and the associated state S1, being the present state from which the transition arrives. Therefore, the S2 is notated as S1.A, interpreted as (S1 AND A).

The on signal 141, after logically ANDed with the on enable signal, which is the ON clock 150, set the NOR latch output TSn 149 to logic "1", which will then wait for the ON clock falling edge 150 that will pass the TSn 149 to D flip flop output Sn 159.

The Sn off signal 142 corresponds to the switch-off condition of Sn implemented by the logical AND of input, which is the input corresponding to the outgoing transition, with its associated temporary state value of the next state. For example, in the state diagram 182 of FIG. 6, for state S1 to cease to be the present state, the switch off condition is the presence of input A and the associated temporary state value of the next state that the transition is going to, TS2, which corresponds to TSn 149 of the SE 110 in FIG. 3 where n=2 Therefore, the S1 switch-off condition is notated as TS2.A, interpreted as (TS2 AND A).

The off signal 142, after logically ANDed with the off enable signal, which is the logic "1" signal 160, reset the NOR latch output TSn 149 to logic "0", which will then wait for the ON clock falling edge 150 that will pass the TSn 149 to D flip flop output 159. In the above example of transitioning from the present state S1 to the next state S2 in FIG. 6, the SE2 of the next state S2 would receive the on signal which would pass a logic "1" to TS2, the SE1 of the present state S1 would receive the off signal which would pass a logic "0" to TS1, then at the falling edge of ON clock 150, TS2 value which is logic "1" would be passed to S2, and TS1 value which is logic "0" would be passed to S1, thus completing a state transition from S1 to S2. The input A can therefore be interpreted as switching on the next state S2 and switching off the present state S1.

Figure 4:
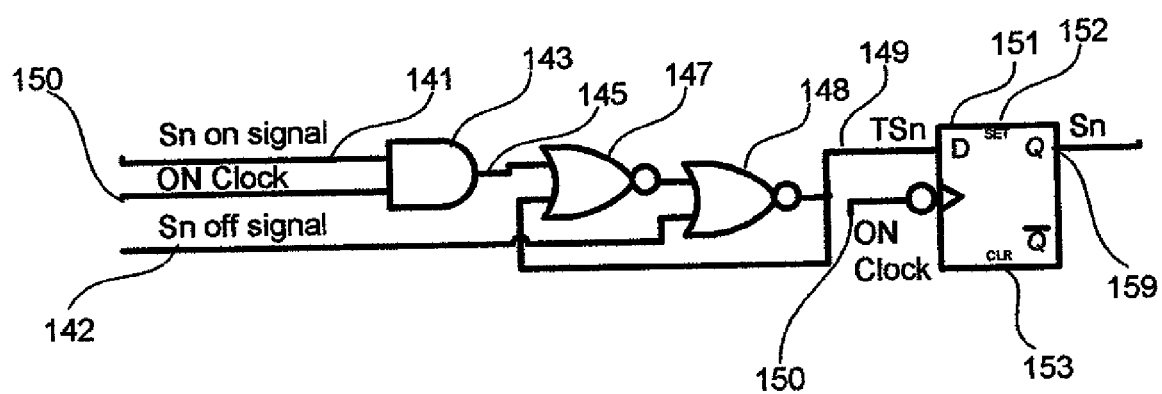
FIG. 4 is a logic diagram of the state element of FIG. 3, with one AND gate, in accordance with an embodiment of the present invention.

As a logic "1" signal is used as the off enable signal, the AND gate 144 is redundant in this first embodiment and can be removed, in which case the off signal 142 is connected directly to the reset input 146 of the NOR latch. The AND gate 144 is shown in FIG. 3 for consistency and for comparison purposes with the second embodiment of the state element, described with reference to FIG. 10, and the third embodiment of the state element, described with reference to FIG. 13. Referring now to FIG. 4, a logic diagram of the state element of FIG. 3, with one AND gate, in accordance with an embodiment of the present invention, is shown. The signals and components shown in FIG. 4 are similar to those shown and described with reference to FIG. 3, however AND gate 144 is redundant and can be removed without affecting performance. FIG. 4 shows the state element of FIG. 3 with the redundant AND gate 144 removed. Other similar modifications can be made to this and other example logic diagrams without departing from the scope of the present invention.

Figure 5:
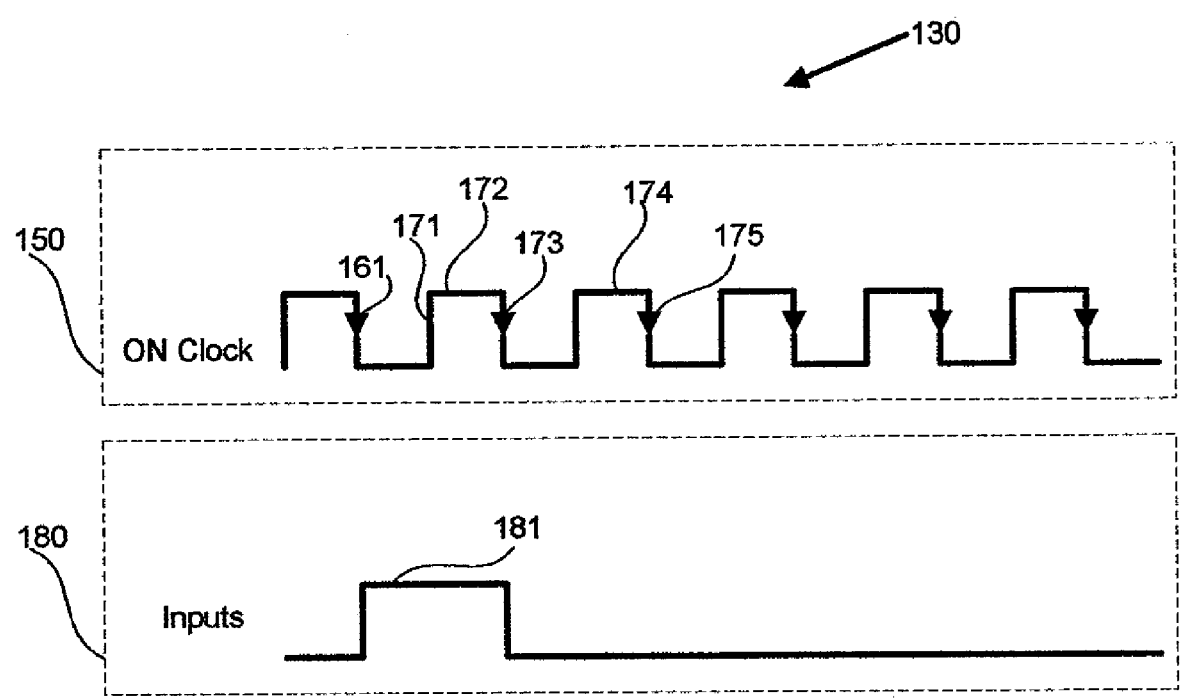
FIG. 5 is a timing diagram showing the timing sequence of an on clock and input signals of the first and second embodiments of state element, shown in FIG. 3 and FIG. 10 respectively, in accordance with an embodiment of the present invention.

FIG. 5 is a timing diagram showing the time sequence of an ON clock 150 and input signals of the first embodiment of the state element described with reference to FIG. 3, in accordance with an embodiment of the present invention. In the timing diagram 130, the relative time sequence of ON clock 150 and SE inputs 181 is shown. The duration of each input 181, when asserted as a logic "1" includes at least one cycle of the ON clock 150. In other embodiments, it is possible for the input to include more or less than one cycle of the ON clock 150. Each input is asynchronous and can be asserted at any time with any duration longer than one ON clock cycle. For reducing metastability problems, inputs may pass through one or more synchronizers, for example, D flip flops with a falling edge triggered by the ON clock 150, so that synchronized inputs with a minimum pulse width of one ON clock cycle are sent to the state machine logic. Referenced inputs should be considered to be synchronized inputs unless otherwise specified.

As illustrated in the timing diagram 130 of FIG. 5, the falling edge 161 will trigger synchronizers to read in inputs 181. These inputs will pass through the respective inverters to give inverted inputs such as A', B', C' . . . for feeding to the state machine embodiments as needed where A' is interpreted as the logical "NEGATION of A" so that when A is logic "1", A' is logic "0", and vice versa. During the period from 161 to 171 all the logic inversions will be completed and all the inputs and their respective inverted inputs will be stable. The ON period 172 will enable the on signal and followed by the off signal of the respective state elements. At the falling edge 173 the TSn 149 is passed to Sn 159 of the SE 110 in FIG. 3. The ON clock 150 is also the master synchronizing signal for the state machine and it may be a periodic, repetitive clock pulses.

Figure 8:
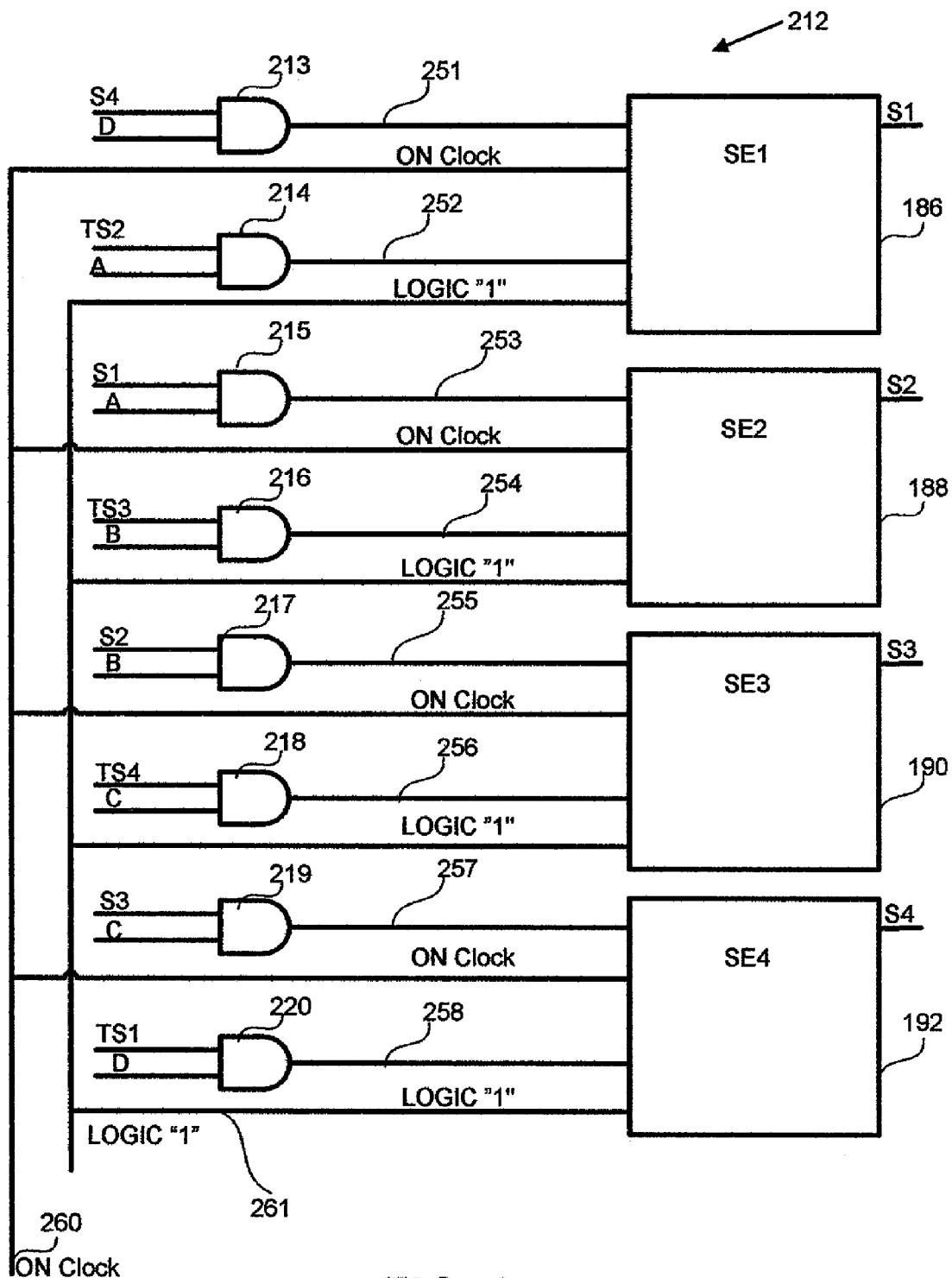
FIG. 8 is a block diagram of the state machine illustrated in FIG. 6, using the first embodiment of the state element, shown in FIG. 3, in accordance with an embodiment of the present invention.

FIG. 8 is a block diagram of the four-state state machine illustrated in FIG. 6, using the first embodiment of the state element, shown in FIG. 3, in accordance with an embodiment of the present invention. An AND gate 213 is used to implement the state S1 switch-on condition, which is S4.D, and an AND gate 214 is used to implement the state S1 switch-off condition, which is TS2.A. An on signal 251 is sent from the AND gate 213 to the SE1 186, and an off signal 252 is sent from the AND gate 214 to the SE1 186. An AND gate 215 is used to implement the state S2 switch-on condition, which is S1.A, and an AND gate 216 is used to implement the state S2 switch-off condition, which is TS3.B. An on signal 253 is sent from the AND gate 215 to the SE2 188, and an off signal 254 is sent from the AND gate 216 to the SE2 188. An AND gate 217 is used to implement the state S3 switch-on condition, which is S2.B, and an AND gate 218 is used to implement the state S3 switch-off condition, which is TS4.C. An on signal 255 is sent from the AND gate 217 to the SE3 190, and an off signal 256 is sent from the AND gate 218 to the SE3 190. An AND gate 219 is used to implement the state S4 switch-on condition, which is S3.C, and an AND gate 220 is used to implement the state S4 switch-off condition, which is TS1.D. An on signal 257 is sent from the AND gate 219 to the SE4 192, and an off signal 258 is sent from the AND gate 220 to the SE4 192. The switch-on conditions are enabled by an ON clock 260, which may be an ON clock as shown in FIG. 5. The switch-off conditions are enabled by a logic "1" signal. The ON clock 260 may also be the master synchronizing signal for each of the SEs.

Figure 9:
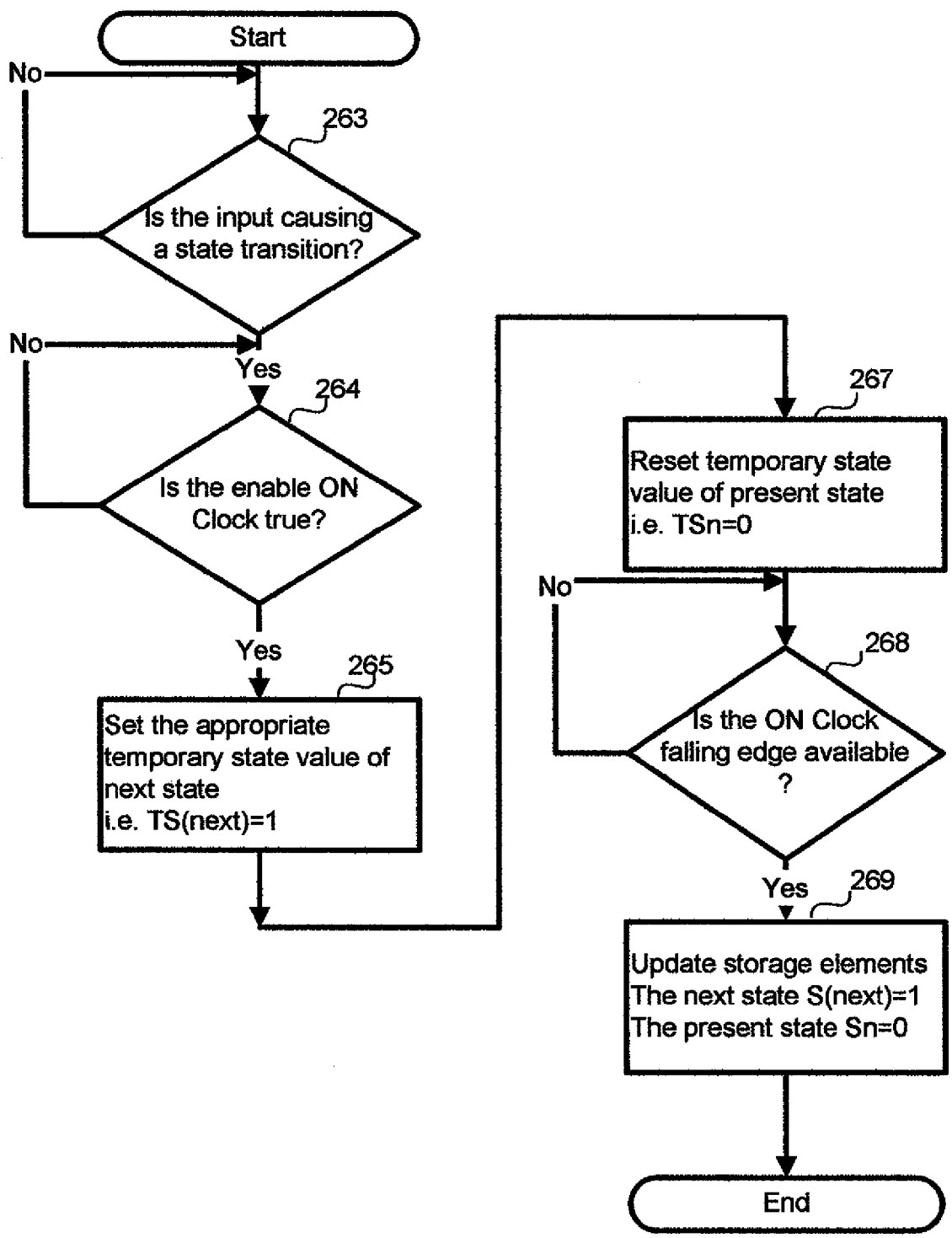
FIG. 9 is a flow chart of a state transition sequence when using the first embodiment of the state element, in accordance with an embodiment of the present invention.

FIG. 9 is a flow chart of a state transition sequence when using the first embodiment of the state element, shown in FIGS. 3 and 4, in accordance with an embodiment of the present invention. Prior to the transition, Sn is assumed to be the present state and state value Sn is true, or logic 1. In step 263, it is determined if received input is causing a state transition. Input will cause a state transition if the received input results in at least one of the on conditions, and therefore the on signal, of one of the state elements being true. If no received input is causing a state transition, then the state machine repeats step 263 until such input is received to cause a state transition. If received input is causing a state transition, then it is determined if the ON clock is true, step 264. If no, then the state machine loops back to step 264 until the ON clock is true, or logic 1. If yes, then the appropriate temporary state value of the "next state" state element is set, TS(next)=1, step 265. At step 267, the temporary state value of the "present state" state element is reset to false, or 0, TSn=0. Next, in step 268, it is determined if the ON clock falling edge is available to trigger an update of the storage element? If no, then the state machine waits for the ON clock falling edge, returning to step 268. If yes, then the affected storage elements are updated, and Sn=TSn=0 and S(next)=TS(next)=1, step 269. Therefore, one state transition is completed. At the end of the transition, S(next) becomes the new present state and therefore become Sn for the next state transition. A new "next state," S(next), will be determined, at least in part, by the next received input.

Figure 10:
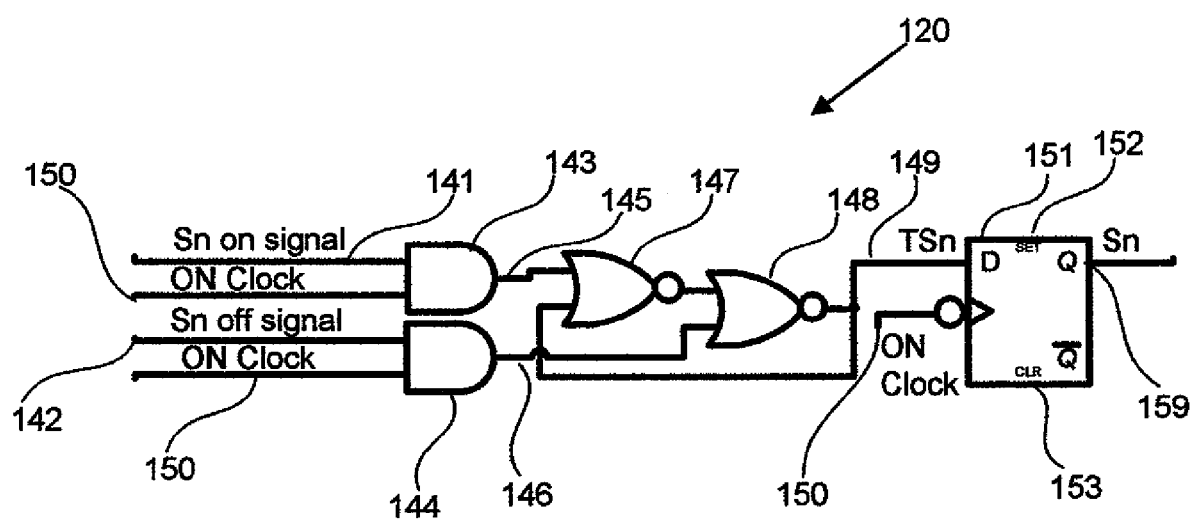
FIG. 10 is a logic diagram of a second embodiment of the state element, in accordance with an embodiment of the present invention.

FIG. 10 is a logic diagram of a second embodiment of the state element, in accordance with an embodiment of the present invention. The second embodiment of a state element ("SE") 120 generally includes first and second AND gates 143, 144, a NOR latch constructed from first and second NOR gates 147, 148, a falling edge-triggered D flip flop 151. The D flip flop has a temporary state input TSn 149, an ON clock input 150, which is also the master synchronizing signal input, a D flip flop output Sn 159, a SET input 152, and a CLR input 153.

The second embodiment of the SE 120 includes logic components that are generally identical to those illustrated in the example first embodiment of the SE 110 shown in FIG. 3 and therefore the description of the operation of the state element of FIG. 3 is also similarly applicable to the operation of the state element shown in FIG. 10, except that an ON clock 150 is provided as the on enable signal and off enable signal for enabling the on signal and off signal respectively, and also acts as the master synchronizing signal whose falling edges enable D flip flop 151 to pass temporary state value TSn 149 to state value Sn 159.

The S(next) switch-on conditions for the next state SE may also be the same. However, the switch-off conditions for the present state SE are different and they are generally similar to the switch-on conditions for the state element corresponding to the next state, S(next). Referring to FIG. 10, the Sn off signal 142 of the SE 120 corresponds to the switch-off condition of Sn implemented by the logical AND of the incoming input and the state value of the present state Sn itself, which is the same as the S(next) on signal for a next state S(next). For example, in the state diagram 182 of FIG. 6, for state S1 to cease to be the present state, the switch off condition is the presence of input A and the state value of the present state S1, and so the S1 switch-off condition is notated as S1.A, interpreted as (S1 AND A).

The off signal 142 which is S1.A, after logically ANDed with the on enable signal which is the ON clock 150, reset the NOR latch output TSn 149 to logic "0" which will then wait for the ON clock falling edge 150 that will pass the TSn 149 to D flip flop output 159, which is the logic state S1 in the above FIG. 6 example. In the above example of transitioning from the present state S1 to the next state S2 in FIG. 6, the SE2 of the next state S2 would receive the on signal which would pass a logic "1" to TS2, the SE1 of the present state S1 would receive the off signal which would pass a logic "0" to TS1, then at the falling edge of ON clock 150, TS2 value which is logic "1" would be passed to S2, and TS1 value which is logic "0" would be passed to S1, thus completing a state transition from S1 to S2. The input A can therefore be interpreted as switching on the next state S2 and switching off the present state S1.

The time sequence of an ON clock 150 and input signals of the second embodiment of the state element described with reference to FIG. 10 may also be the same as that illustrated in the timing diagram as shown in FIG. 5.

Figure 11:
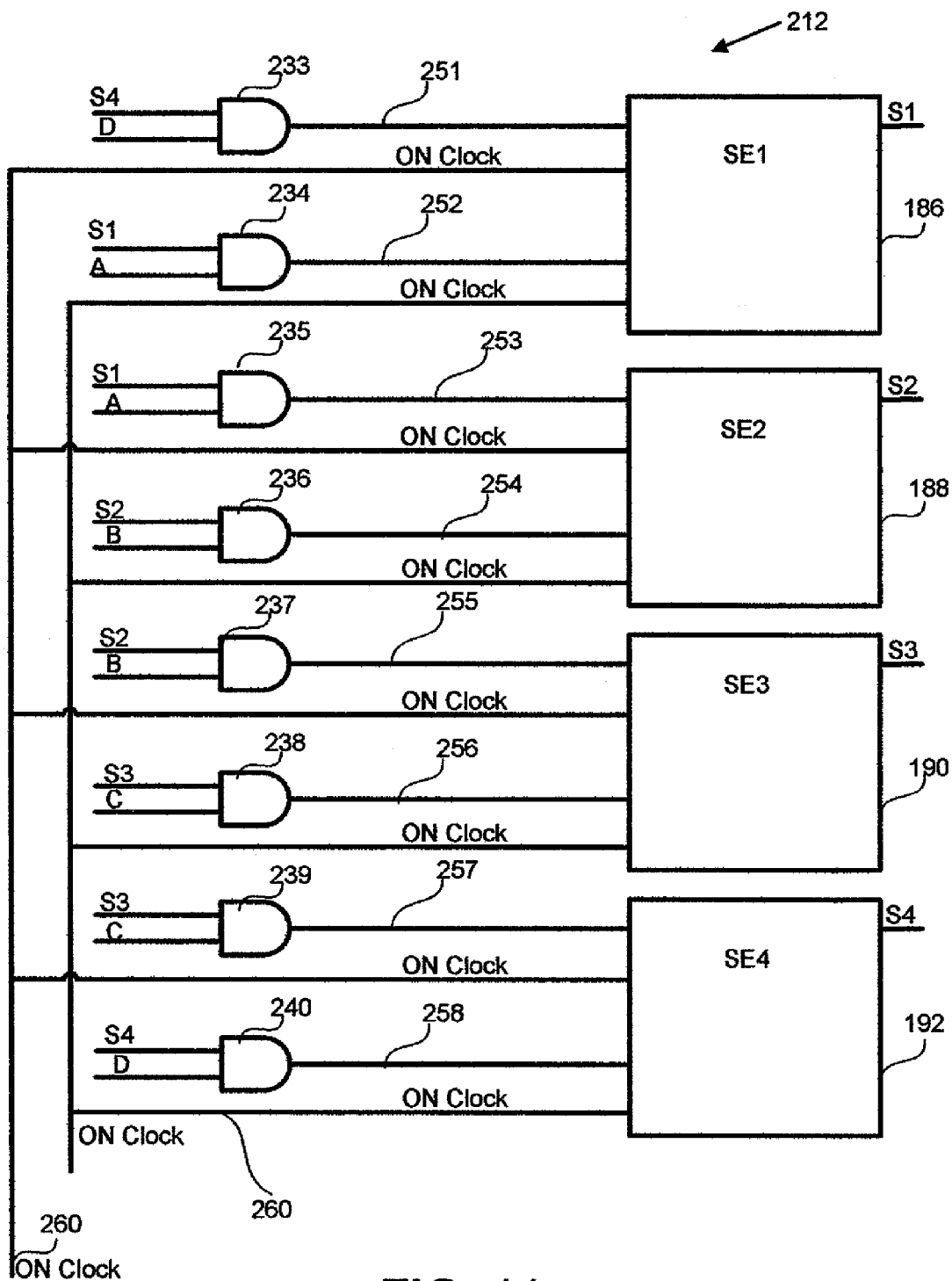
FIG. 11 is a block diagram of the state machine illustrated in FIG. 6, using the second embodiment of the state element, shown in FIG. 10, in accordance with an embodiment of the present invention.

FIG. 11 is a block diagram of the four-state state machine illustrated in FIG. 6, using the second embodiment of the state element, shown in FIG. 10, in accordance with an embodiment of the present invention. An AND gate 233 is used to implement the state S1 switch-on condition, which is S4.D, and an AND gate 234 is used to implement the state S1 switch-off condition, which is S1.A. An on signal 251 is sent from the AND gate 233 to the SE1 186, and an off signal 252 is sent from the AND gate 234 to the SE1 186. An AND gate 235 is used to implement the state S2 switch-on condition, which is S1.A, and an AND gate 236 is used to implement the state S2 switch-off condition, which is S2.B. An on signal 253 is sent from the AND gate 235 to the SE2 188, and an off signal 254 is sent from the AND gate 236 to the SE2 188. An AND gate 237 is used to implement the state S3 switch-on condition, which is S2.B, and an AND gate 238 is used to implement the state S3 switch-off condition, which is S3.C. An on signal 255 is sent from the AND gate 237 to the SE3 190, and an off signal 256 is sent from the AND gate 238 to the SE3 190. An AND gate 239 is used to implement the state S4 switch-on condition, which is S3.C, and an AND gate 240 is used to implement the state S4 switch-off condition, which is S4.D. An on signal 257 is sent from the AND gate 239 to the SE4 192, and an off signal 258 is sent from the AND gate 240 to the SE4 192. The switch-on conditions and the switch-off conditions are enabled by an ON clock 260, which may be an ON clock as shown in FIG. 5. The ON clock 260 may also be the master synchronizing signal for each of the SEs.

Figure 12:
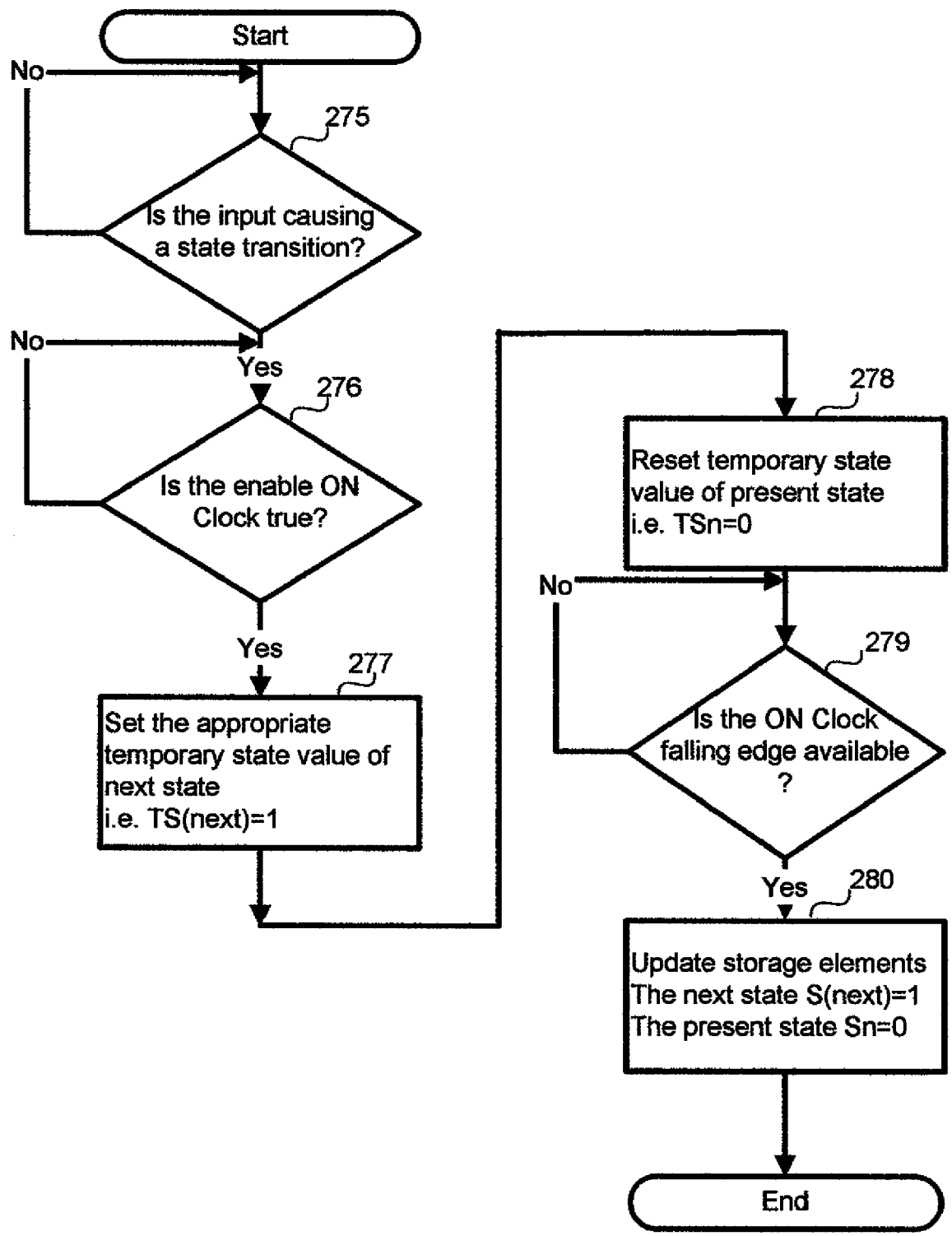
FIG. 12 is a flow chart of a state transition sequence when using the second embodiment of the state element, in accordance with an embodiment of the present invention.

FIG. 12 is a flow chart of a state transition sequence when using the second embodiment of the state element, which is shown in FIG. 10, in accordance with an embodiment of the present invention. Prior to the transition, Sn is assumed to be the present state and state value Sn is true, or logic 1. In step 275, it is determined if received input is causing a state transition. Input will cause a state transition if the received input results in at least one of the off conditions or on conditions, and therefore the off signal or on signal, respectively, of at least one of the state elements being true. If no received input is causing a state transition, then the state machine repeats step 275 until such input is received to cause a state transition. If received input is causing a state transition, then it is determined if the ON clock is true, or logic 1, step 276. If no, then the state machine loops back to step 276 until the ON clock is true. If yes, then the appropriate temporary state value of the "next state" state element is set, TS(next)=1, step 277. At step 278, the temporary state value of the "present state" state element is reset to false, or 0, TSn=0. Next, in step 279, it is determined if the ON clock falling edge is available to trigger an update of the storage element? If no, then the state machine waits for the ON clock falling edge, returning to step 279. If yes, then the affected storage elements are updated, and Sn=TSn=0 and S(next)=TS(next)=1, step 280. Therefore, one state transition is completed. At the end of the transition, S(next) becomes the new present state and therefore become Sn for the next state transition. A new "next state," S(next), will be determined, at least in part, by the next received input.

While the above-described embodiments of the present invention have been described with the use of synchronized input signals, embodiments of the present invention may also operate without the use of input synchronizers.

Figure 13:
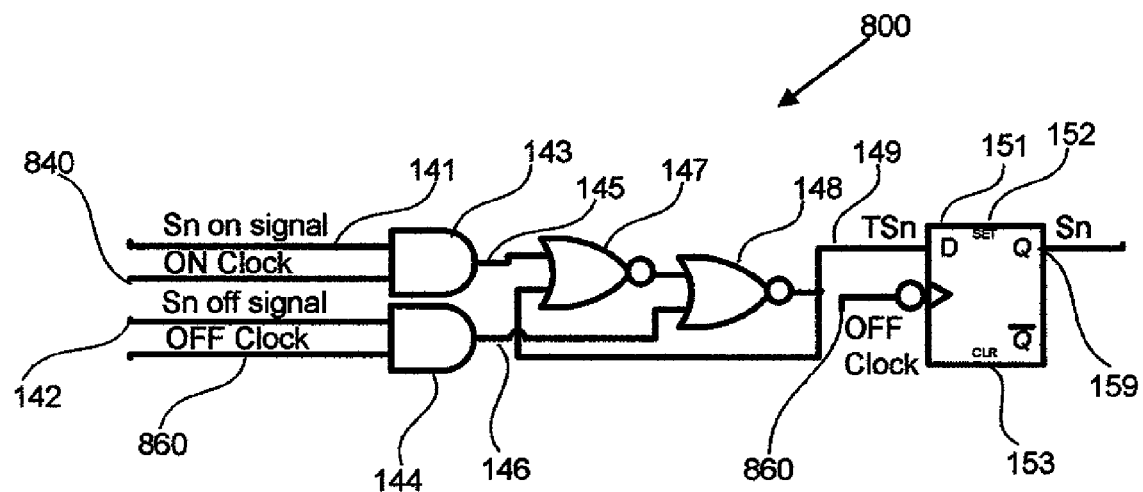
FIG. 13 is a logic diagram of a third embodiment of the state element, in accordance with an embodiment of the present invention.

Referring now to FIG. 13, a logic diagram of a third embodiment of the state element, in accordance with an embodiment of the present invention, is shown. The third embodiment of the state element ("SE") 800, together with the example ON Clock 840 and OFF Clock 860 shown in FIG. 14, may be used in an implementation of a state machine without the use of input synchronizers.

The logic components of the third embodiment of the SE 800 is similar to the first and second embodiments, shown in FIGS. 3 and 10, respectively and therefore the description of the operation of state element of FIG. 3 is also similarly applicable to the operation of the state element shown in FIG. 13, except that an OFF clock 860 is provided as the off enable signal for enabling the off signal 142, and also acts as the master synchronizing signal whose falling edges enable D flip flop 151 to pass temporary state value TSn 149 to state value Sn 159. An ON Clock 840 is provided as the on enable signal to the SE 800 for enabling the on signal.

The switch-on and switch-off conditions in this third embodiment of SE 800 are identical to the switch-on and switch-off conditions of the first embodiment of SE 110 as shown in FIG. 3 and therefore may be implemented using identical combinational logic in the first embodiment of SE 110 as described with reference to FIG. 3.

Figure 14:
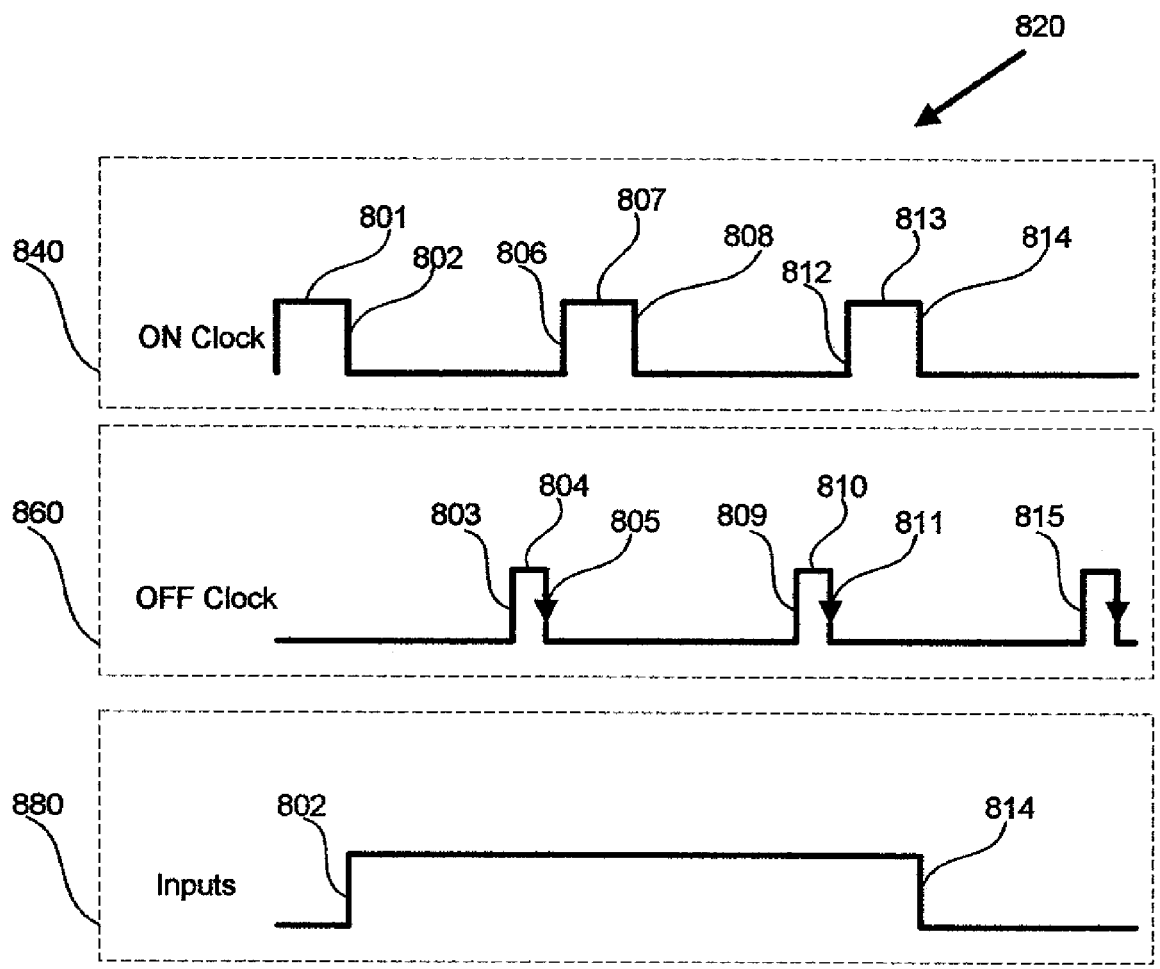
FIG. 14 is a timing diagram showing the timing sequence of an on clock, an off clock, and an input signal of the third embodiment of the state element, shown in FIG. 13, in accordance with an embodiment of the present invention.

FIG. 14 is a timing diagram showing the timing sequence of an ON clock, an OFF clock, and an input signal, in accordance with an embodiment of the present invention. The timing diagram for the third embodiment of the SE 800 includes reference numbers 801 to 815 to identify different sections of the time sequence. The raw asynchronous inputs, when active, may have a pulse width larger than two cycles of the ON clock 840. This width is illustrated extending from reference number 802 to reference number 814. In one embodiment, the inputs may be fed to the state logic directly without passing through synchronizers, thus they can arrive at any time instant. For example, an input can arrive at the falling edge 802 of the ON clock 840. The possible outcomes are either (1) the input is picked up by the ON clock pulse 801 and a successful state transition is completed after OFF clock falling edge 805, or (2) the input is missed by the ON clock pulse 801, in which case it will be picked up by the second ON clock pulse 807 and the state transition will be successfully completed at the OFF clock falling edge 811 as the input width is two cycles of ON clock 840, or (3) the NOR latch output TSn 149 of the SE 800 in FIG. 13 goes into metastable state. In this case, the width between the ON clock falling edge 802 and the OFF clock rising edge 803 can be set to allow sufficient time for the metastable state to settle down. The settled state can be either a logic "1" or logic "0" which does not matter as the correct state transition operation will be successfully completed in either case. That is, if TSn 149 is logic "1", the state transition will be completed at OFF clock falling edge 805. if TSn is logic "0", then the input will be picked up by the second ON clock pulse 807 and transition will be successfully completed at OFF clock falling edge 811. Therefore, the state machine can work quite reliably, even without synchronizers, in the third embodiment.

Figure 15:
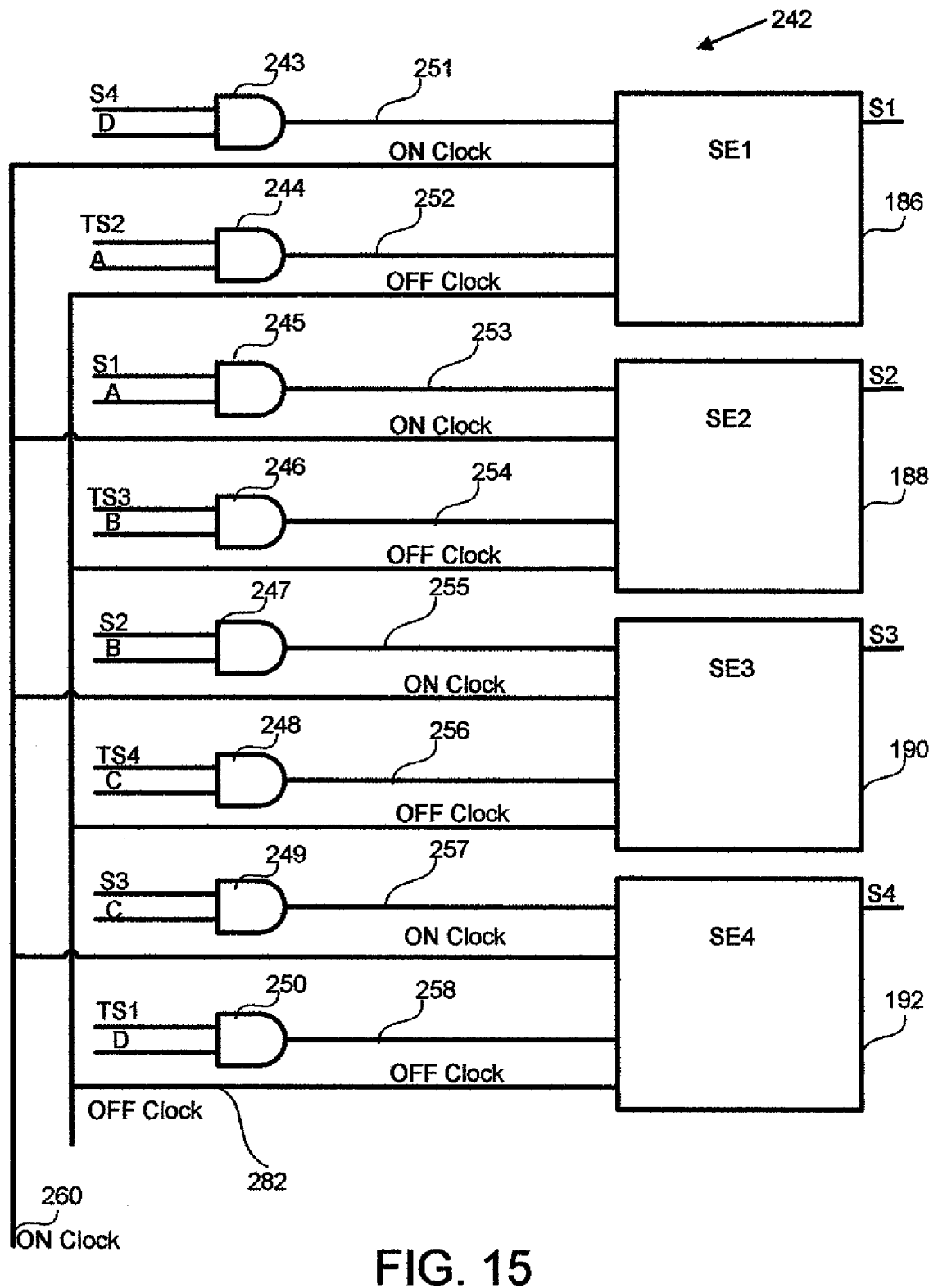
FIG. 15 is a block diagram of the state machine illustrated in FIG. 6, using the third embodiment of the state element, shown in FIG. 13, in accordance with an embodiment of the present invention.

FIG. 15 is a block diagram of the four-state state machine illustrated in FIG. 6, using the third embodiment of the state element, shown in FIG. 13, in accordance with an embodiment of the present invention. An AND gate 243 is used to implement the state S1 switch-on condition, which is S4.D, and an AND gate 244 is used to implement the state S1 switch-off condition, which is TS2.A. An on signal 251 is sent from the AND gate 243 to the SE1 186, and an off signal 252 is sent from the AND gate 244 to the SE1 186. An AND gate 245 is used to implement the state S2 switch-on condition, which is S1.A, and an AND gate 246 is used to implement the state S2 switch-off condition, which is TS3.B. An on signal 253 is sent from the AND gate 245 to the SE2 188, and an off signal 254 is sent from the AND gate 246 to the SE2 188. An AND gate 247 is used to implement the state S3 switch-on condition, which is S2.B, and an AND gate 248 is used to implement the state S3 switch-off condition, which is TS4.C. An on signal 255 is sent from the AND gate 247 to the SE3 190, and an off signal 256 is sent from the AND gate 248 to the SE3 190. An AND gate 249 is used to implement the state S4 switch-on condition, which is S3.C, and an AND gate 250 is used to implement the state S4 switch-off condition, which is TS1.D. An on signal 257 is sent from the AND gate 249 to the SE4 192, and an off signal 258 is sent from the AND gate 250 to the SE4 192. The switch-on conditions are enabled by an ON clock 260, which may be an ON clock as shown in FIG. 14. The switch-off conditions are enabled by an OFF clock 282, which may be an OFF clock as shown in FIG. 14. The OFF clock 282 may also be the master synchronizing signal for each of the SEs.

Figure 16:
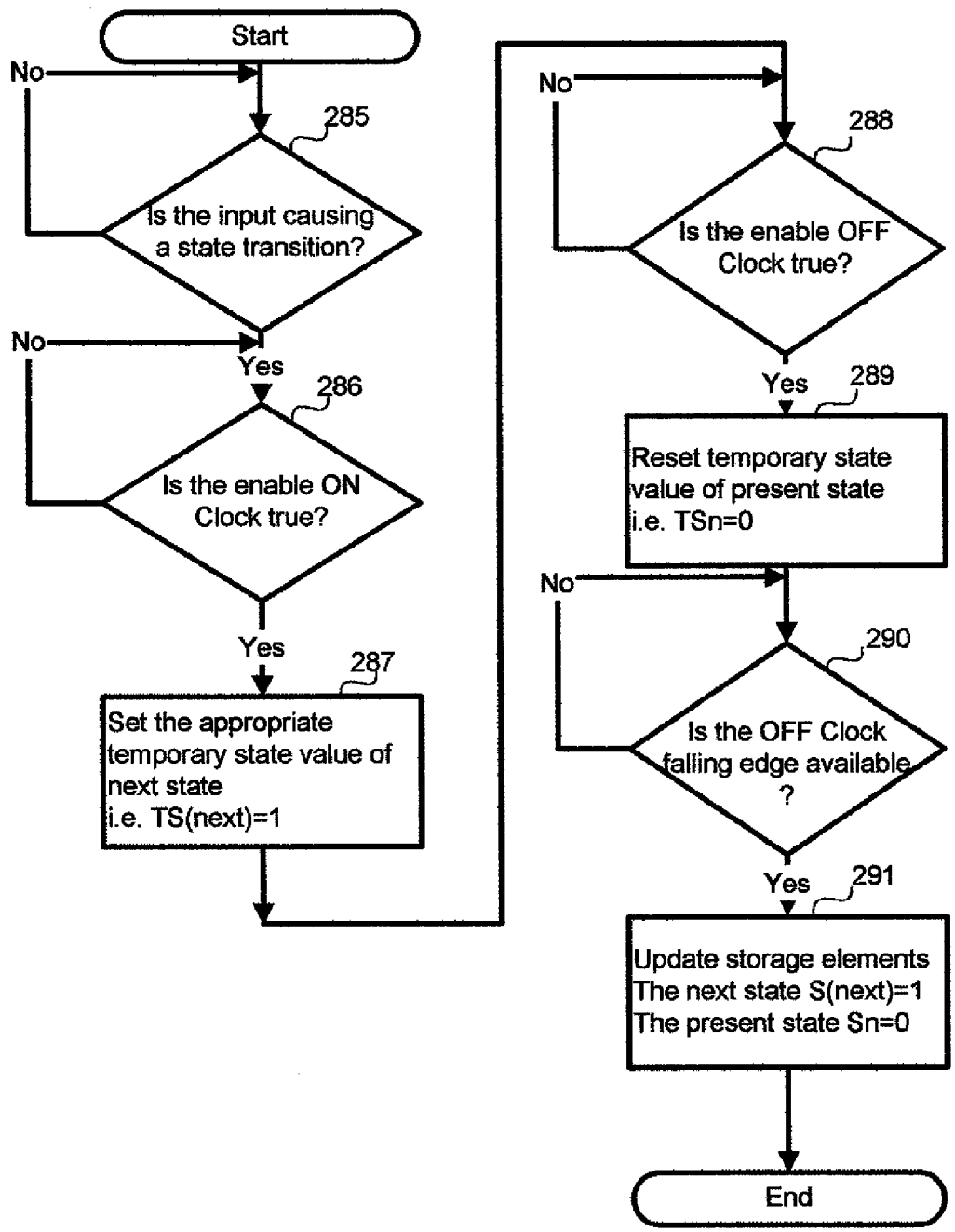
FIG. 16 is a flow chart of a state transition sequence when using the third embodiment of the state element, in accordance with an embodiment of the present invention.

FIG. 16 is a flow chart of the state transition sequence when using the third embodiment of the state element, in accordance with an embodiment of the present invention.

Referring to FIG. 16, prior to the transition, Sn is assumed to be the present state and state value Sn is true, or logic 1. In step 285, it is determined if received input is causing a state transition. Input will cause a state transition if the received input results in at least one of the off conditions or on conditions, and therefore the off signal or on signal, respectively, of at least one of the state elements being true. If no received input is causing a state transition, then the state machine repeats step 285 until such input is received to cause a state transition. If received input is causing a state transition, then it is determined if the ON clock is true, or logic 1, step 286. If no, then the state machine loops back to step 286 until the ON clock is true. If yes, then the appropriate temporary state value of the "next state" state element is set, TS(next)=1, step 287.

At step 288, it is determined if the OFF clock is equal to logic 1, or true. If no, then the state machine loops back to step 288 until the OFF clock is true. If yes, then at step 289, the temporary state value of the "present state" state element is reset to false, or 0, TSn=0. Next, in step 290, it is determined if the OFF clock falling edge is available to trigger an update of the storage element? If no, then the state machine waits for the OFF clock falling edge, returning to step 290. If yes, then the affected storage elements are updated, and Sn=TSn=0 and S(next)=TS(next)=1, step 291. Therefore, one state transition is completed. At the end of the transition, S(next) becomes the new present state and therefore become Sn for the next state transition. A new "next state," S(next), will be determined, at least in part, by the next received input.

Figure 17:
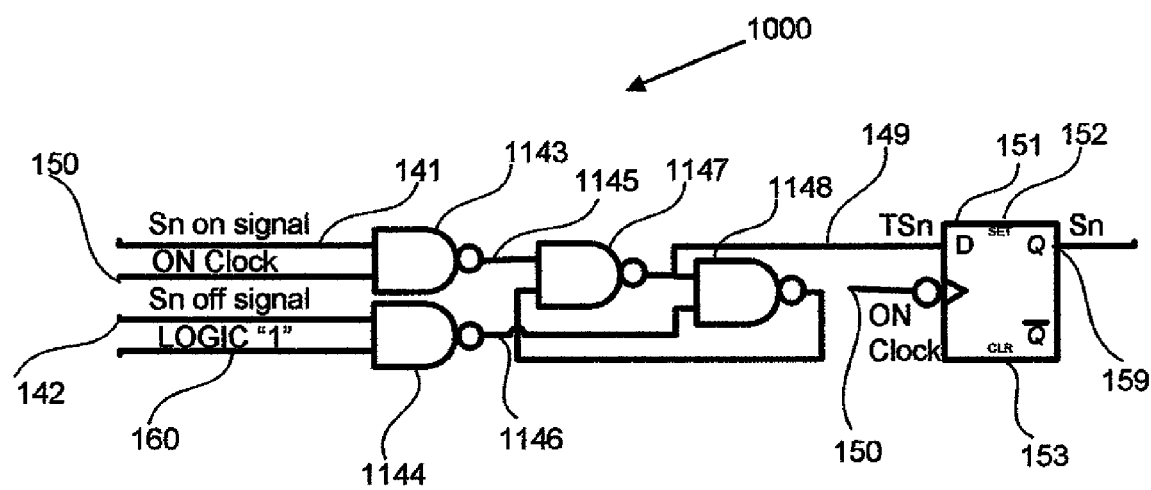
FIG. 17 is a logic diagram of the fourth embodiment of the state element, in accordance with an embodiment of the present invention.

FIG. 17 is a logic diagram of the fourth embodiment of the state element, in accordance with an embodiment of the present invention. The fourth embodiment of the state element receives the on signal 141, the ON clock 150 which acts as both the on enable signal and the master synchronizing signal, the off signal 142, the off enable signal 160, which is a logic "1", and the D flip flop 151, which are similar to the first embodiment of the state element shown in FIG. 3, but NAND gates and a NAND latch are used instead of AND gates and NOR latch. The functionality is generally similar to that of the other embodiments of the state element.

The fourth embodiment of the state element ("SE") 1000 generally includes first and second NAND gates 1143, 1144 a NAND latch constructed from first NAND gate 1147 and second NAND gate 1148, and a falling edge triggered D flip flop 151. The D flip flop has a temporary state value input TSn 149, the ON clock input 150, which is the master synchronizing signal input, a D flip flop output Sn 159, a SET input 152, and a CLR input 153.

The NAND latch operates as follows: when first NAND input 1145, which is the set input, is logic "0" and second NAND input 1146, which is the reset input, is logic "1", the NAND latch output 149, which is also the TSn input, will give a logic "1". When the first NAND input 1145 is logic "1" and the second NAND input 1146 is logic "0", the output 149 will give a logic "0". When both the first NAND input 1145 and second NAND input 1146 are logic "1", the latch output 149 will remain at the last logic state. Both the first NAND input 1145 and the second NAND input 1146 may not be asserted simultaneously as logic "0".

The operation of the D flip flop and the processing of the received on signal 141 and the received off signal 160 are generally similar to that described above with reference to the first embodiment of the state machine shown and described with reference to FIG. 3.

From the above description, the use of NAND gates and a NAND latch can perform an operation that is logically equivalent to that operation performed by the other embodiments of the SE using AND gates and a NOR latch. In one embodiment, the NAND implementation may have a faster performance time since the on signal passes only two NAND gates, which are first NAND gate 1143 and second NAND gate 1147, before changing the value of TSn.

The following example embodiments demonstrate the application of embodiments of the invention to design and implement complex state machines. The example state machine has eighteen inputs and nine states. The herein described 4-state and 9-state state machines are example illustrations of embodiments of the present invention. Similarly, state machines having any number of states and any number of desired inputs and transitions may be designed and implemented in accordance with embodiments of the present invention.

Figure 18:
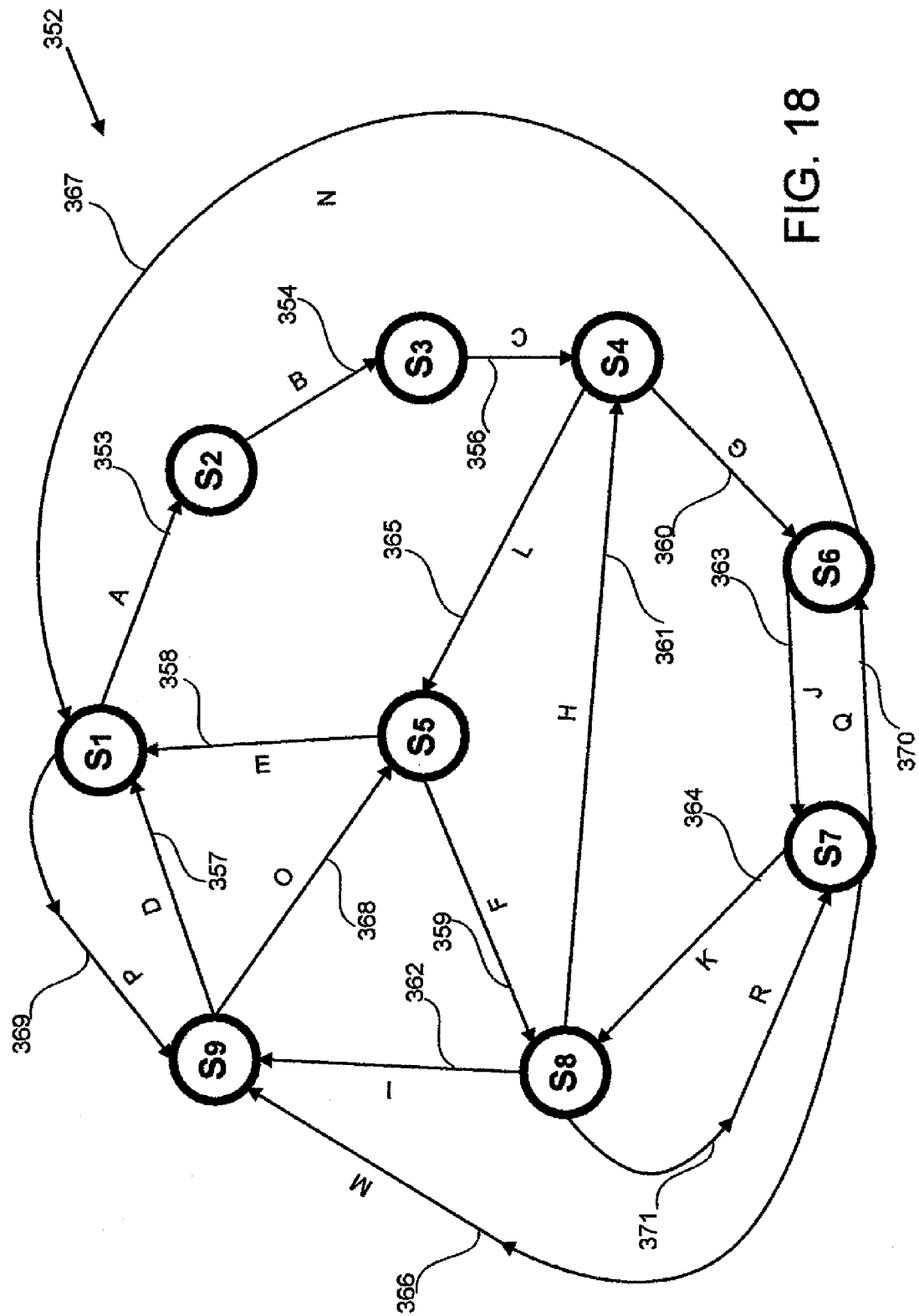
FIG. 18 is a state diagram of an example nine-state state machine, with eighteen inputs, in accordance with an embodiment of the present invention.

FIG. 18 is a state diagram of an example state machine, in accordance with an embodiment of the present invention. The state diagram 352 includes nine states and eighteen transitions, which also identify the inputs required for transition from one state to another state. The eighteen inputs and the associated transitions are indicated by arrows identifying input A through R, which cause the transitions. The nine states are identified with the following references: S1, S2, S3, S4, S5, S5, S7, S8, and S9. Transitions are relative to the particular state. For example, for state S1, the incoming transitions are N, E, and D. They are represented by the incoming arrows pointing to the state S1. The outgoing transitions are A and P. They are represented by the outgoing arrows leaving the state S1.

The state diagram 352 of FIG. 18 can be interpreted as follows: The state transition directions are indicated by transition arrows, which are activated by inputs for implementations of the state machine illustrated in FIG. 18. For example, when state S1 is active and the input A is asserted (e.g., a logic "1" or HIGH), then, following the transition 353 from S1 to S2 in the state diagram, the state machine will transition from state S1 to state S2. That is, state S2 will become active and state S1 will become inactive. Similarly, when state S4 is active and the input G is asserted (e.g., a logic "1" or HIGH), then the state machine will transition from S4 to state S6, following the transition 360 from S4 to S6. Other state transitions can occur in a similar way as follows: a transition 354 from S2 to S3 occurs in response to input B; a transition 356 occurs in response to input C; a transition 357 from S9 to S1 occurs in response to input D; a transition 358 from S5 to S1 occurs in response to input E; a transition 359 from S5 to S8 occurs in response to input F; a transition 361 from S8 to S4 occurs in response to input H; a transition 362 from S8 to S9 occurs in response to input I; a transition 363 from S6 to S7 occurs in response to input J; a transition 364 from S7 to S8 occurs in response to input K; a transition 365 from S4 to S5 occurs in response to input L; a transition 366 from S7 to S9 occurs in response to input M; a transition 367 from S6 to S1 occurs in response to input N; a transition 368 from S9 to S5 occurs in response to input O; a transition 369 from S1 to S9 occurs in response to input P; a transition 370 from S7 to S6 occurs in response to input Q; and a transition 371 from S8 to S7 occurs in response to input R.

Figure 19:
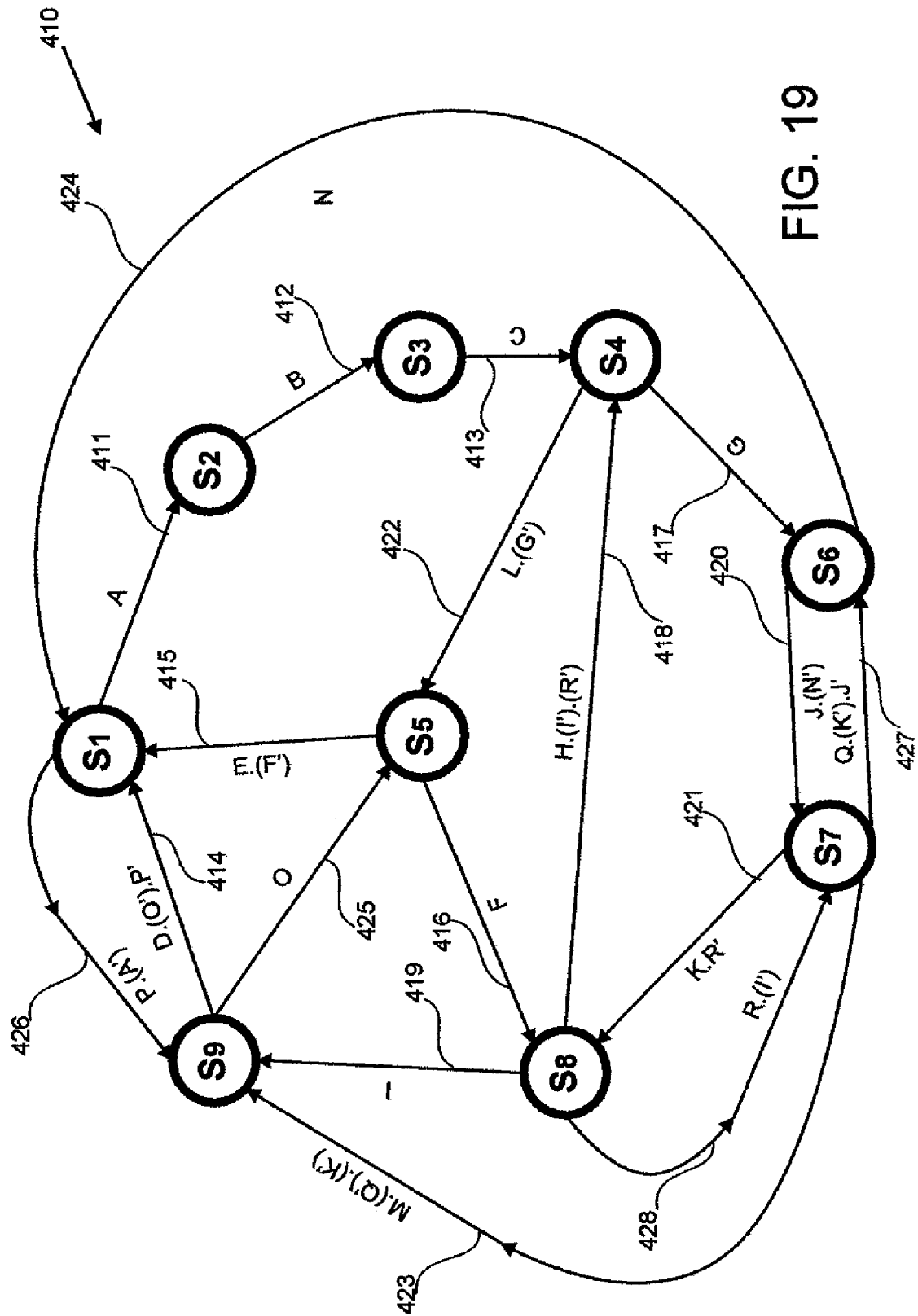
FIG. 19 is a state diagram of a nine-state state machine, which is a modification of a the nine-state state machine shown in FIG. 18, with mutual exclusion and circular loop prevention, in accordance with an embodiment of the present invention.

FIG. 19 is a state diagram of a nine-state state machine, which is a modification of the nine-state state machine shown in FIG. 18, with mutual exclusion and with circular loop prevention, in accordance with an embodiment of the present invention. The state diagram 410 includes nine states and eighteen transitions, which also identify the inputs required for transition from one state to another state. The nine states are identified with the following references: S1, S2, S3, S4, S5, S5, S7, S8, and S9. The eighteen transitions between states are indicated by arrows labeled with reference numbers. State transitions shown in FIG. 19 occur as follows: a transition 411 from S1 to S2 occurs in response to input A; a transition 412 from S2 to S3 occurs in response to input B; a transition 413 occurs in response to input C; a transition 414 from S9 to S1 occurs in response to input D.(O').P'; a transition 415 from S5 to S1 occurs in response to input E.(F'); a transition 416 from S5 to S8 occurs in response to input F; a transition 417 from S4 to S6 occurs in response to input G; a transition 418 from S8 to S4 occurs in response to input H.(I').(R'); a transition 419 from S8 to S9 occurs in response to input I; a transition 420 from S6 to S7 occurs in response to input J.(N'); a transition 421 from S7 to S8 occurs in response to input K.R'; a transition 422 from S4 to S5 occurs in response to input L.(G'); a transition 423 from S7 to S9 occurs in response to input M.(Q').(K'); a transition 424 from S6 to S1 occurs in response to input N; a transition 425 from S9 to S5 occurs in response to input O; a transition 426 from S1 to S9 occurs in response to input P.(A'); a transition 427 from S7 to S6 occurs in response to input Q.(K').J'; and a transition 428 from S8 to S7 occurs in response to input R.(I').

The modification as described with reference to FIG. 19 may be made prior to implementation to reduce or prevent ambiguity in the implementation of the state machine. For illustrative purposes, consider state S4 that has two outgoing transitions 417 and 422. If corresponding input signals are asserted simultaneously, the implemented state machine may either transition to state S6 or state S5, which would result in unpredictable outcomes. Therefore, the two outgoing transitions 417 and 422, should be made logically mutual exclusive Thus L is modified to be L.(G') where G' is interpreted as the logical "NEGATION of G" so that when G is logic "1", G' is logic "0", and vice versa. The bracket as used in bracketed G' in the expression L.(G'), and the other bracketed negated inputs in state diagrams in general, is to indicate that the negated input is for implementing mutual exclusion for simultaneous outgoing transitions, as distinguished from circular loop prevention purpose. Input G remains in this case. Thus, (L.(G') AND G) is a logic "0" which means logically mutual exclusive. In general, each pair of outgoing transitions from a state that has several outgoing transitions will be modified to be logically mutual exclusive. Next, consider the state S6, transition 420, state S7, and transition 427, which together form a closed circular loop. If both inputs J and Q are allowed to be asserted simultaneously, then during the state transition period both the temporary states TS6 and TS7 may be switched off to logic "0" before the falling edge of ON clock 150, resulting in incorrect final states of both states S6 and S7 being logic "0". To prevent this from happening, the two inputs J and Q are modified to be logically mutually exclusive. Therefore, input required for transition 427 would be modified from Q to be Q.J'. By including the outgoing transition 427 mutual exclusion rule, the transition is further modified to become Q.(K').J', as is identified in FIG. 19.

The other two closed circular loops in FIG. 18 are handled in a similar way. The loop formed by state S1, transition 426 in response to input P, state S9, and transition 414 in response to input D becomes loop formed by state S1, transition 426 in response to input P.(A'), state S9, and transition 414 in response to input D.(O').P' in FIG. 19. The remaining loop in FIG. 18 formed by state S7, transition 421 in response to input K, state S8, and transition 428 in response to input R becomes the loop formed by state S7, transition 421 in response to input K.R', state S8, and transition 428 in response to input R.(I').

Figure 20A:
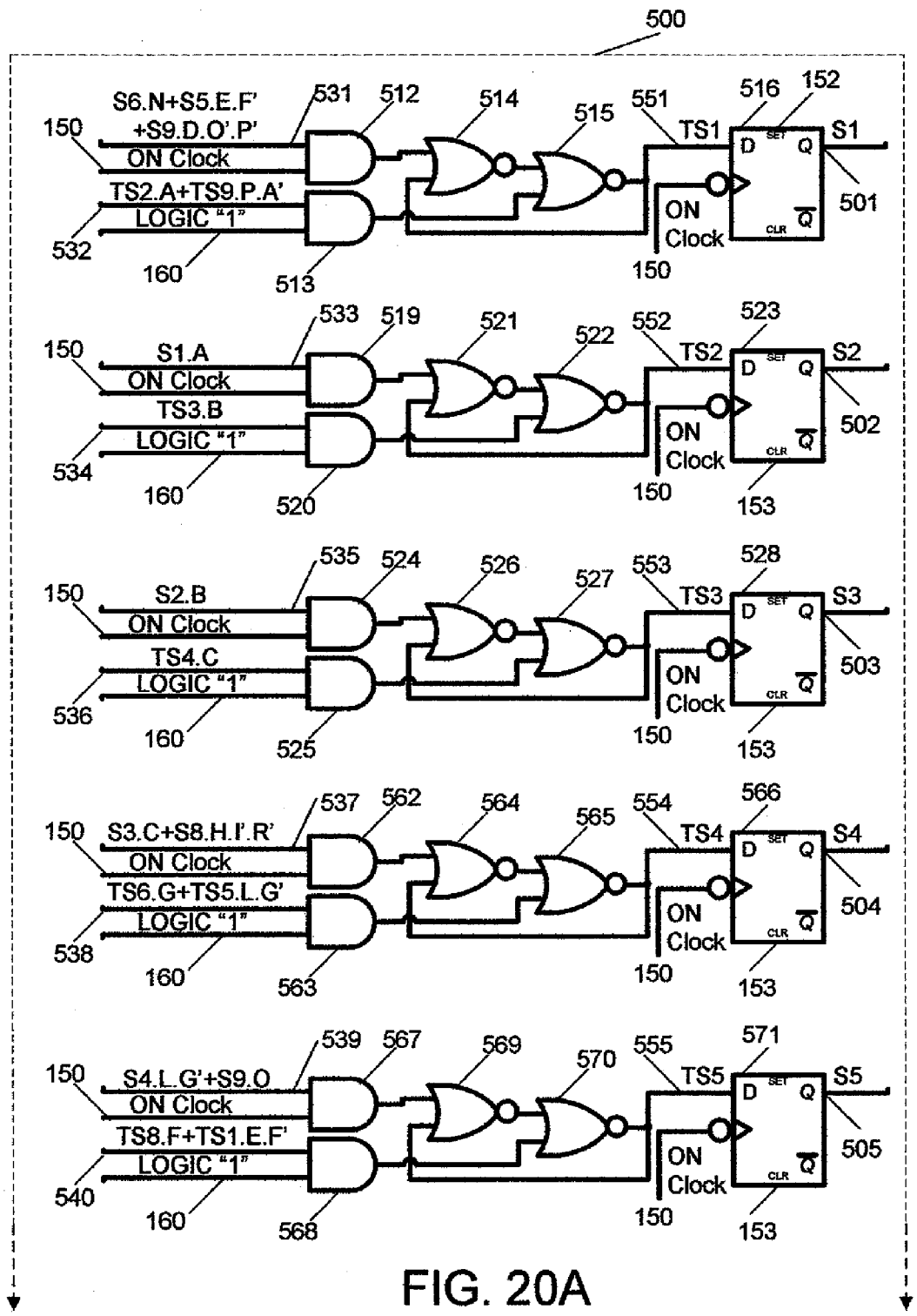
FIG. 20A is the first part of a logic diagram of the state machine illustrated in FIG. 19, using the first embodiment of the state element, shown in FIG. 3, in accordance with an embodiment of the present invention.
Figure 20B:
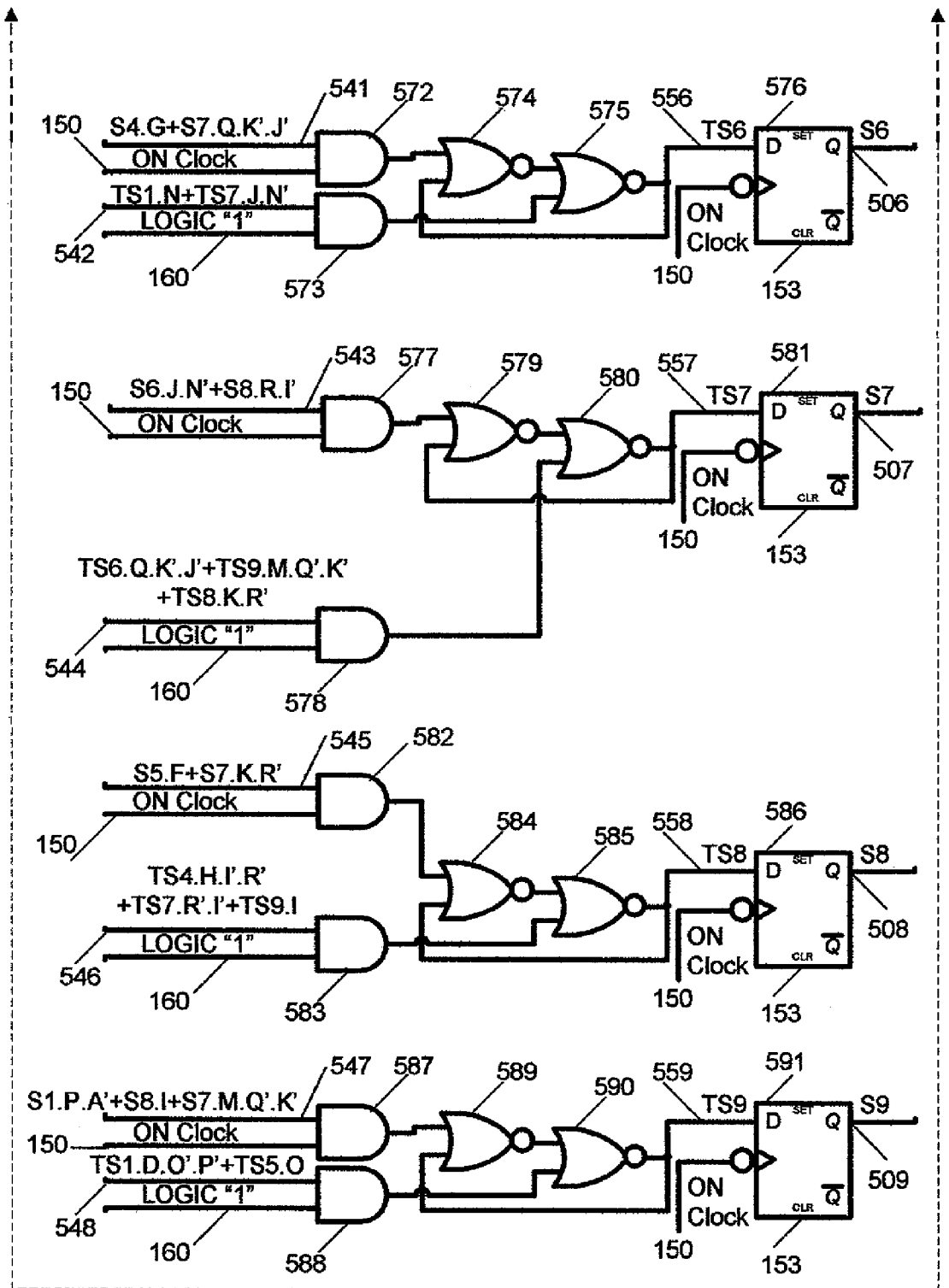
FIG. 20B is the second part of a logic diagram of the state machine illustrated in FIG. 19, using the first embodiment of the state element, shown in FIG. 3, in accordance with an embodiment of the present invention.

FIG. 20A is the first part of a logic diagram of the state machine illustrated in FIG. 19, which is continued on FIG. 20B, the second part of the logic diagram of the state machine illustrated in FIG. 19, in accordance with an embodiment of the present invention. The logic diagram of FIGS. 20A and 20B corresponds to the state machine illustrated by the state diagram of FIG. 19, using the first embodiment of the SE, which is shown in FIG. 3 and the corresponding state transition flow chart is shown in FIG. 9.

The switch-on conditions and switch-off conditions defined for use with the logic diagram illustrated in FIGS. 20A and 20B are listed in the form of Boolean expressions in the following table, TABLE 1:

| State: | Switch-on conditions: (Each Boolean expression below is logically ANDed with the ON Clock) | Switch-off conditions: |
|---|---|---|
| S1 | S6.N + S5.E.F' + S9.D.O'.P' | TS2.A + TS9.P.A' |
| S2 | S1.A | TS3.B |
| S3 | S2.B | TS4.C |
| S4 | S3.C + S8.H.I'.R' | TS6.G + TS5.L.G' |
| S5 | S4.L.G' + S9.O | TS8.F + TS1.E.F' |
| S6 | S4.G + S7.Q.K'.J' | TS1.N + TS7.J.N' |
| S7 | S6.J.N' + S8.R.I' | TS6.Q.K'.J' + TS9.M.Q'.K' + TS8.K.R' |
| S8 | S5.F + S7.K.R' | TS4.H.I'.R'+ TS7.R.I' + TS9.I |
| S9 | S1.P.A' + S8.I + S7.M.Q'.K' | TS1.D.O'.P' + TS5.O |

Switch-on conditions for each state are determined by considering the inputs corresponding to the incoming transitions and the state values of the states that the transitions may come from. For example, referring to FIG. 19, the switch-on conditions for state S1 are (S5 AND E.(F')) (corresponding to transition 415), OR (S6 AND N) (corresponding to transition 424), OR (S9 AND D.(O').P') (corresponding to transition 414). Therefore, referring to the corresponding logic diagram 500 in FIG. 20A, the on signal corresponding to the switch-on conditions for state S1 is expressed in the form of Boolean expression as (S6.N+S5.E.F'+S9.D.O'.P'), where each dot (".") is interpreted as a logical AND and each plus ("+") is interpreted as a logical OR. Also, an on enable signal, which is an ON clock is logically ANDed with the on signal as shown in FIG. 20A.

In the first embodiment of the SE logic, described with reference to FIG. 3, switch-off conditions are determined by considering the inputs corresponding to the outgoing transitions and the temporary state values of the states that the transitions may go to. For example, referring to FIG. 19, the switch-off conditions for state S1 are (TS2 AND A) OR (TS9 AND P.A'). Therefore, referring to the corresponding logic diagram 500 in FIG. 20A, the off signal corresponding to the switch-off conditions for state S1 is shown notated as (TS2.A+TS9.P.A'). These switch-off conditions for state S1 will cause the state value S1 501 to be inactive, or logical "0".

Referring to FIGS. 20A and 20B, an example state machine 500 corresponding to the state diagram 410 of FIG. 19 is shown. Nine state elements ("SE") of the first embodiment, shown with reference to FIG. 3, are used to represent the nine states of the state diagram 410, one SE for each state. Each SE includes first and second AND gates, a NOR latch constructed from a first NOR gate and a second NOR gate, and a D flip flop. In the illustrated logic diagram 500, SE1 includes a first AND gate 512, a second AND gate 513, a NOR latch constructed from a first NOR gate 514 and a second NOR gate 515, and a D flip flop 516; SE2 includes a first AND gate 519, a second AND gate 520, a NOR latch constructed from a first NOR gate 521 and a second NOR gate 522, and a D flip flop 523; SE3 includes a first AND gate 524, a second AND gate 525, a NOR latch constructed from a first NOR gate 526 and a second NOR gate 527, and a D flip flop 528; SE4 includes a first AND gate 562, a second AND gate 563, a NOR latch constructed from a first NOR gate 564 and a second NOR gate 565, and a D flip flop 566; SE5 includes a first AND gate 567, a second AND gate 568, a NOR latch constructed from a first NOR gate 569 and a second NOR gate 570, and a D flip flop 571; SE6 includes a first AND gate 572, a second AND gate 573, a NOR latch constructed from a first NOR gate 574 and a second NOR gate 575, and a D flip flop 576; SE7 includes a first AND gate 577, a second AND gate 578, a NOR latch constructed from a first NOR gate 579 and a second NOR gate 580, and a D flip flop 581; SE8 includes a first AND gate 582, a second AND gate 583, a NOR latch constructed from a first NOR gate 584 and a second NOR gate 585, and a D flip flop 586; and SE9 includes a first AND gate 587, a second AND gate 588, a NOR latch constructed from a first NOR gate 589 and a second NOR gate 590, and a D flip flop 591.

An example operation is as follows: Initially, state value S1 501 is set to logic "1" by asserting S1 SET terminal 152, at the same time state value S2 502 is set to logic "0" by asserting S2 CLR terminal 153, other states' CLR terminals are also asserted so state values S2 502 through state value S9 509 are at logic "0". Then, the assertion is removed and the initialization is completed. For illustration purposes, while the state machine is in state S1, suppose that input A is asserted. Then, the on signal 533 of SE2 which has the switch on condition of S1.A will be received as logic "1". When there is an ON clock pulse, the logic "1" will be passed, through the NOR latch, to the temporary state value TS2 552. Temporary state value TS2 552 will logically AND with the input A at the off signal 532 of SE1, which has the switch-off condition of TS2.A, thereby passing a logic "0" to temporary state value TS1 551. At the next falling edge of the ON clock 150, the temporary state value TS1 551 will be passed to state value S1 501, making state value S1 logic "0". At the same falling edge of the ON clock 150, the temporary state value TS2 is passed to state value S2 502, making state value S2 logic "1", completing a state transition from state S1 to state S2, which was activated by the input A. Other state transitions work in similar way.

Figure 21:
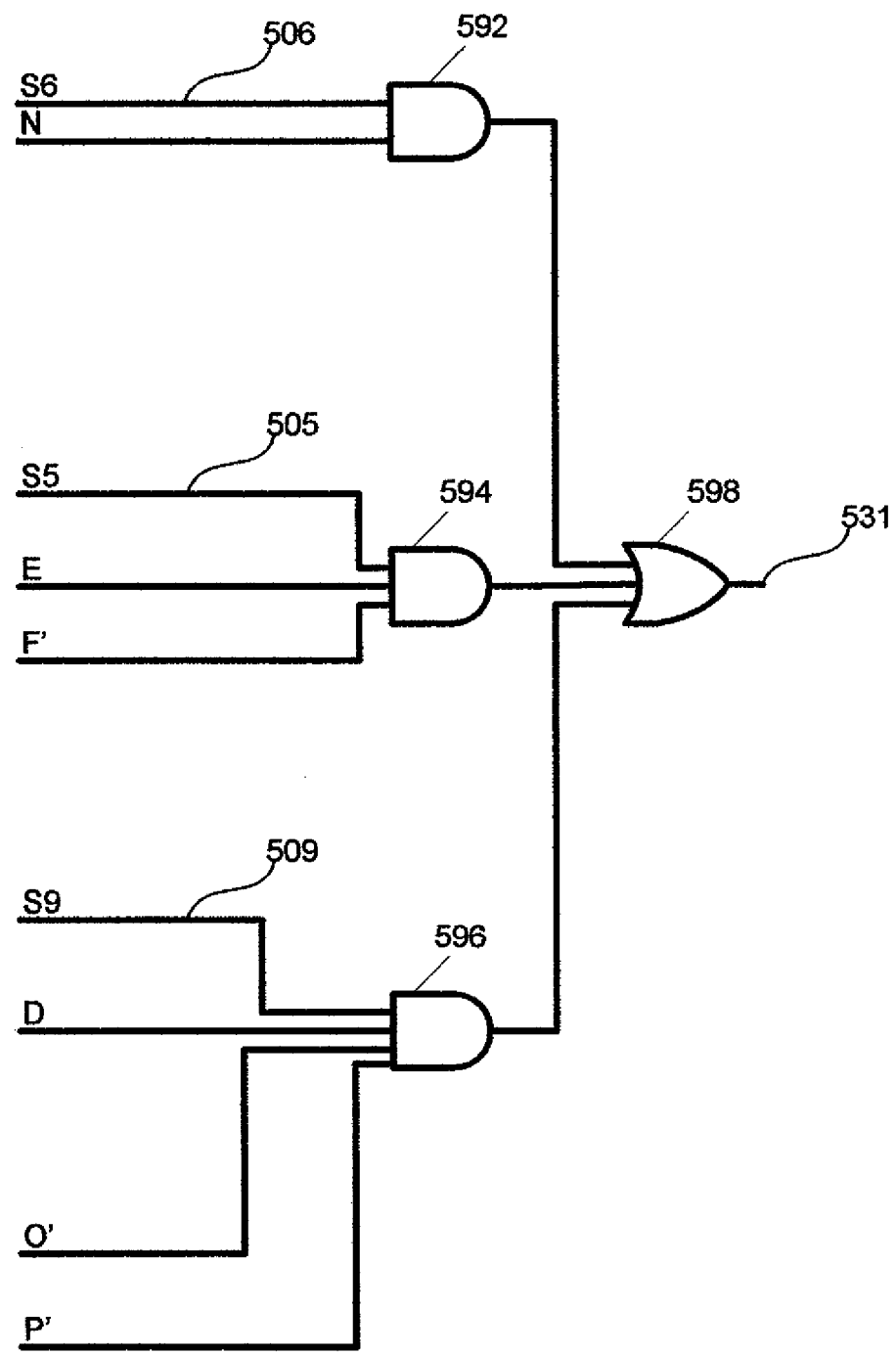
FIG. 21 is a logic diagram of the on signal of the SE1 shown in FIG. 20A, implemented in combinational logic diagram, in accordance with an embodiment of the present invention.

FIG. 21 is a logic diagram of the on signal of the SE1 shown in FIG. 20A, implemented in combinational logic diagram, in accordance with an embodiment of the present invention. The logic diagram shown in FIG. 21 is an example implementation of the S1 on signal 531 illustrated in FIG. 20A and listed in Table 1. Boolean expression S6.N+S5.E.F'+S9.D.O'.P' corresponding to the switch-on conditions of S1 may be implemented using three AND gates 592, 594, 596 and one OR gate 598. Other on signals and off signals may be implemented in similar way.

Referring to FIG. 20B, consider the closed circular loop effect during a state transition from state S7 to state S6. The on signal 541 of SE6 includes the switch-on condition S7.Q.K'.J'. The J' is included to prevent input J from being asserted (logic "1") at the same time with input Q. Suppose that J' were removed. Then, the switch-off condition TS6.Q.K'.J' at off signal 544 of SE7 will become TS6.Q.K'. Also, on signal 541 of SE6 has a switch on condition of S7.Q.K' and off signal 542 of SE6 has a switch-off condition of TS7.J.N'. In this hypothetical condition, assume that now both input J and Q are allowed to be asserted simultaneously, and J and Q are logic "1", and N', K' are also logic "1". Then, during the state transition from S7 to S6 by the asserted input Q, and during, for example, the ON clock period 172 of FIG. 5, temporary state value TS6 556 will become logic "1", through the state S6 switch-on condition S7.Q.K', but state S6 switch-off condition TS7.J.N' is also asserted since temporary state value TS7 557 of SE7 has not yet been switched off by the state S7 switch-off condition TS6.Q.K'. That is, the on signal 541 of SE6 and the off signal 542 of SE6, and the off signal 544 of SE7 507 are all now logic "1". This may lead to both temporary state value TS6 556 and temporary state value TS7 557 being switched off. Then, after the falling edge of the ON clock, the state values S6 506 and S7 507 will become logic "0" which is an incorrect transition.

In some applications it may be desirable that two inputs, such as J and Q, be allowed to be asserted simultaneously. Therefore, with reference to the situation described above with reference to states S6 and S7, it may be desirable to remove the circular loop prevention that is illustrated in FIG. 19.

Figure 22:
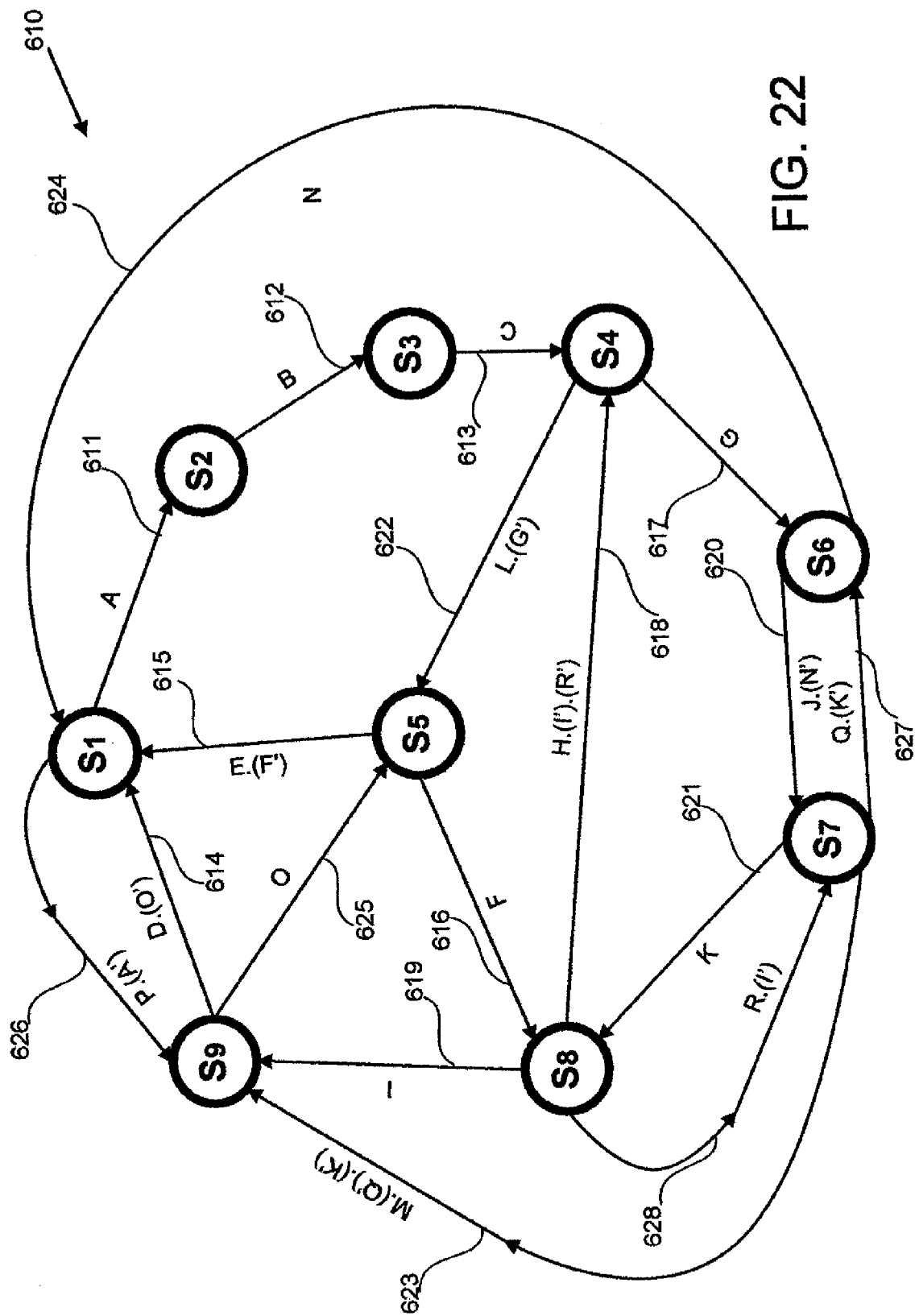
FIG. 22 is a state diagram of a nine-state state machine, without circular loop prevention, in accordance with an embodiment of the present invention.

Referring now to FIG. 22, a state diagram 610 of a second example nine-state machine, without circular loop prevention, in accordance with an embodiment of the present invention, is shown. In comparison of the state diagram 410 of FIG. 19 to the state diagram 610 of FIG. 22, transition 427 in response to input Q.K'.J'becomes transition 627 in response to input Q.K'. Likewise, transition 421 in response to input KR' becomes transition 621 in response to input K, and transition 414 in response to input D.O'.P' becomes transition 614 in response to input D.O'. Thereby, in the state diagram 610 of FIG. 22, the closed circular loops formed between states S6 and S7, S7 and S8, and S1 and S9 can permit simultaneous assertion of inputs of J and Q, K and R, and P and D, respectively. The logic diagram illustrated in FIGS. 23A and 23B, using the second embodiment of the SE shown in FIG. 10, illustrates an implementation of the state machine illustrated by the state diagram 610 of FIG. 22.

The state diagram 610 of FIG. 22 includes eighteen input signals and nine states. The nine states are identified with the following references: S1, S2, S3, S4, S5, S6, S7, S8, and S9. The eighteen transitions between states are indicated by arrows labeled with reference numbers. State transitions shown in FIG. 22 occur as follows: a transition 611 from S1 to S2 occurs in response to input A; a transition 612 from S2 to S3 occurs in response to input B; a transition 613 from S3 to S4 occurs in response to input C; a transition 614 from S9 to S1 occurs in response to input D.(O'); a transition 615 from S5 to S1 occurs in response to input E.(F'); a transition 616 from S5 to S8 occurs in response to input F; a transition 617 from S4 to S6 occurs in response to input G; a transition 618 from S8 to S4 occurs in response to input H.(I').(R'); a transition 619 from S8 to S9 occurs in response to input I; a transition 620 from S6 to S7 occurs in response to input J.(N'); a transition 621 from S7 to S8 occurs in response to input K; a transition 622 from S4 to S5 occurs in response to input L.(G'); a transition 623 from S7 to S9 occurs in response to input M.(Q').(K'); a transition 624 from S6 to S1 occurs in response to input N; a transition 625 from S9 to S5 occurs in response to input O; a transition 626 from S1 to S9 occurs in response to input P.(A'); a transition 627 from S7 to S6 occurs in response to input Q.(K'); and a transition 628 from S8 to S7 occurs in response to input R.(I').

Figure 23A:
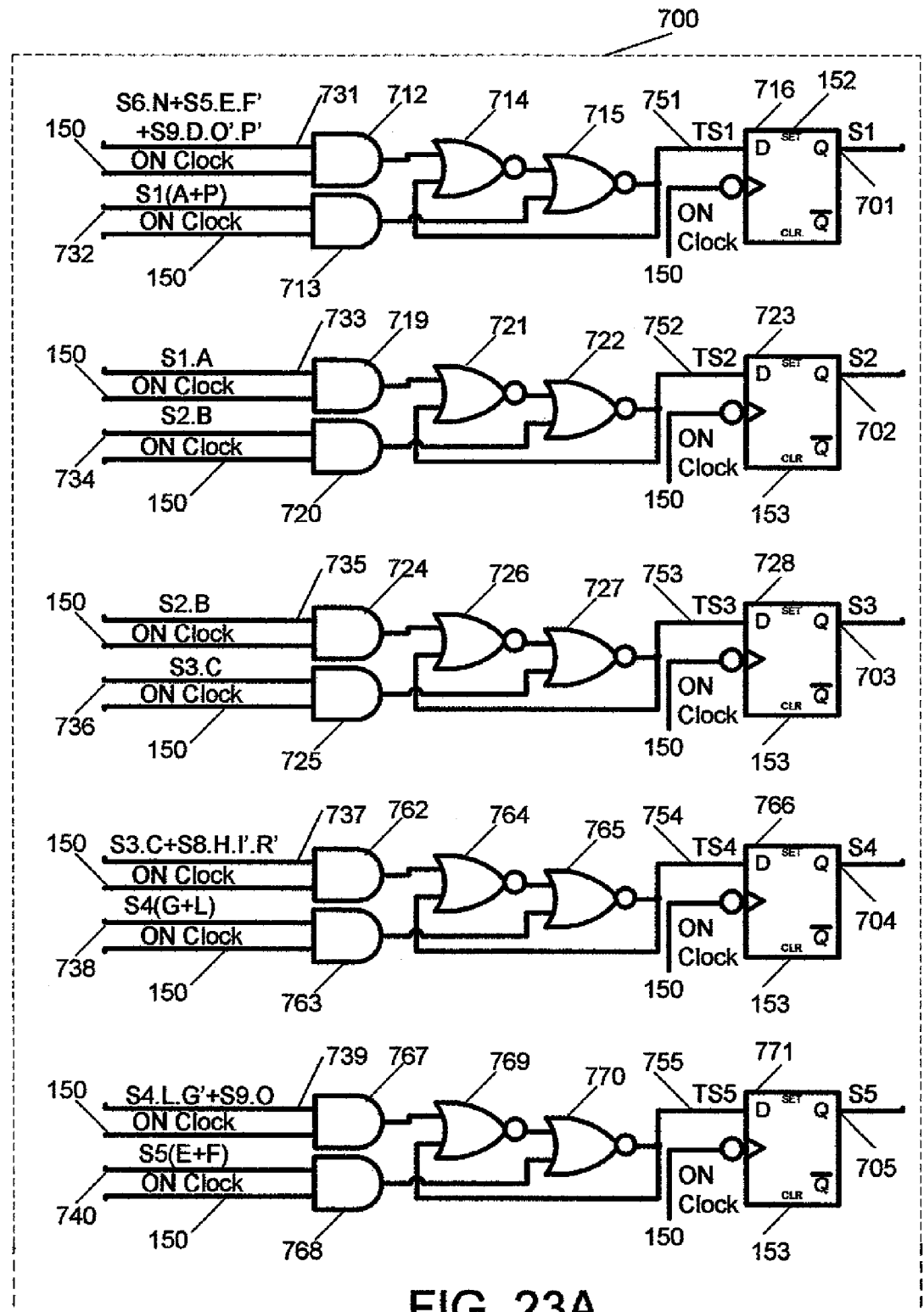
FIG. 23A is the first part of a logic diagram of the state machine illustrated in FIG. 22, using the second embodiment of the state element, shown in FIG. 10, in accordance with an embodiment of the present invention.
Figure 23B:
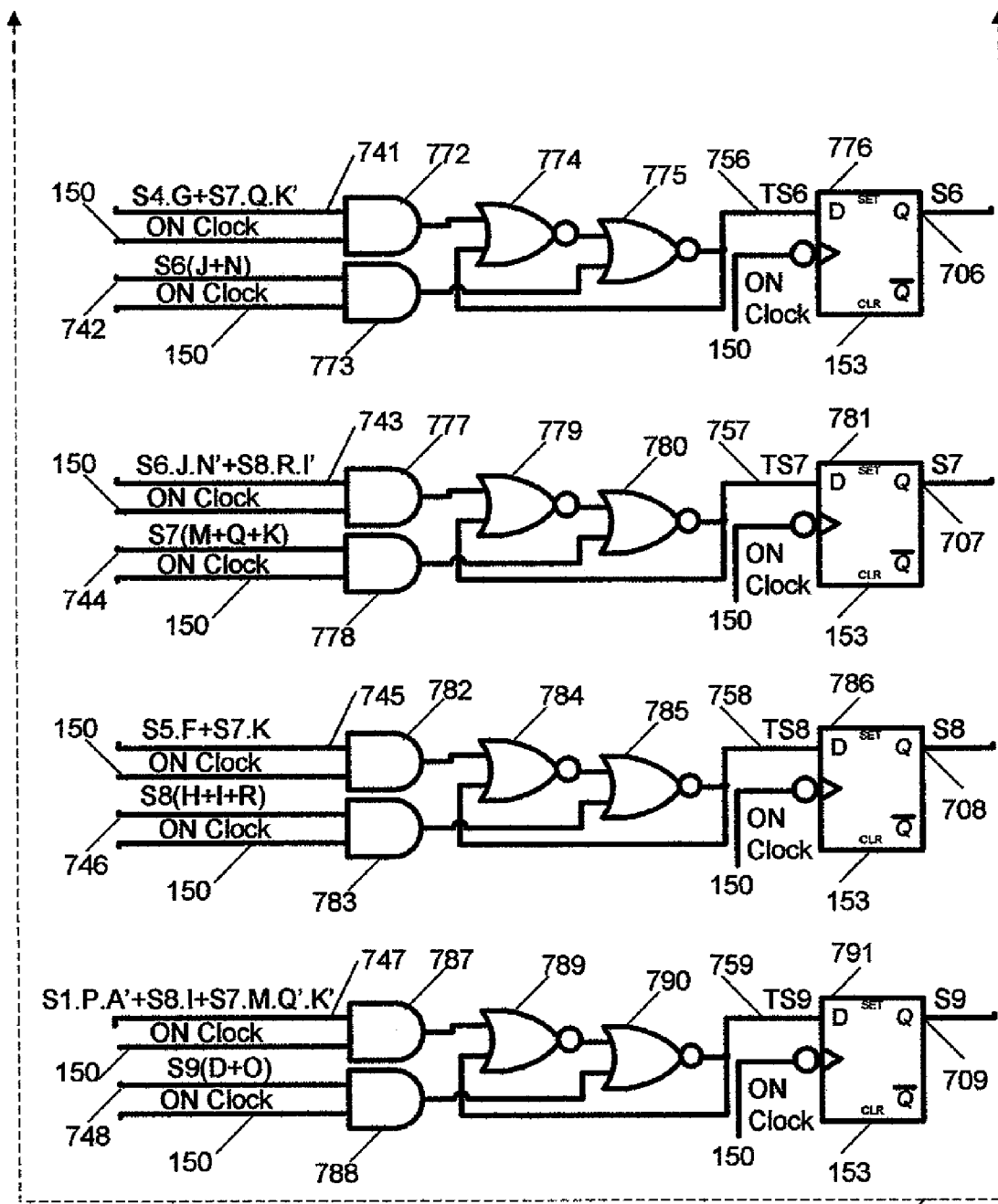
FIG. 23B is the second part of a logic diagram of the state machine illustrated in FIG. 22, using the second embodiment of the state element, shown in FIG. 10, in accordance with an embodiment of the present invention.

Referring now to FIG. 23A, the first part of a logic diagram of the state machine illustrated in FIG. 22, which is continued on FIG. 23B, the second part of the logic diagram of the state machine illustrated in FIG. 22, is shown, in accordance with an embodiment of the present invention. The logic diagram 700 of FIGS. 23A and 23B corresponds to the state machine illustrated by the state diagram of FIG. 22, using the second embodiment of the SE, which is shown in FIG. 10, and the corresponding state transition flow chart is shown in FIG. 12.

In the illustrated logic diagram 700, SE1 includes a first AND gate 712, a second AND gate 713, a NOR latch constructed from a first NOR gate 714 and a second NOR gate 715, and a D flip flop 716; SE2 includes a first AND gate 719, a second AND gate 720, a NOR latch constructed from a first NOR gate 721 and a second NOR gate 722, and a D flip flop 723; SE3 includes a first AND gate 724, a second AND gate 725, a NOR latch constructed from a first NOR gate 726 and a second NOR gate 727, and a D flip flop 728; SE4 includes a first AND gate 762, a second AND gate 763, a NOR latch constructed from a first NOR gate 764 and a second NOR gate 765, and a D flip flop 766; SE5 includes a first AND gate 767, a second AND gate 768, a NOR latch constructed from a first NOR gate 769 and a second NOR gate 770, and a D flip flop 771; SE6 includes a first AND gate 772, a second AND gate 773, a NOR latch constructed from a first NOR gate 774 and a second NOR gate 775, and a D flip flop 776; SE7 includes a first AND gate 777, a second AND gate 778, a NOR latch constructed from a first NOR gate 779 and a second NOR gate 780, and a D flip flop 781; SE8 includes a first AND gate 782, a second AND gate 783, a NOR latch constructed from a first NOR gate 784 and a second NOR gate 785, and a D flip flop 786; and SE9 includes a first AND gate 787, a second AND gate 788, a NOR latch constructed from a first NOR gate 789 and a second NOR gate 790, and a D flip flop 791.

The switch-on conditions for each state in the logic diagram 700 in FIGS. 23A and 23B are the same as those derived in connection with FIGS. 20A and 20B. However, the switch-off conditions for each corresponding state are different. The switch-off conditions for each state in the logic diagram 700 are determined by considering the inputs corresponding to the outgoing transitions and the state value of each state itself. For example, referring to FIG. 22, the switch-off conditions for state S1 are (S1 AND A) (corresponding to transition 611), notated as S1.A, OR (S1 AND P. A') (corresponding to transition 626) notated as S1.P.A'. Thus, the switch-off conditions for state S1 shown in FIG. 22 expressed in Boolean expression is S1.A+S1.P.A', which can be simplified using Boolean simplification method to give S1 (A+P). Referring to FIG. 23A, the off signal corresponding to the switch-off conditions for state S1 can be enabled by the ON clock 150, shown in FIG. 5, to switch off its temporary state TS1, and during the falling edge 173 (FIG. 5) of the ON clock 150, the state value S1 701 will become logic "0", changing state S1 to be off. In summary, the switch-off conditions of the present state, that is state S1 in the above example, is identical to the switch-on conditions of the next states which are, states S2 or S9. Likewise, the switch-off conditions of other states are derived in similar way.

The switch-on and switch-off conditions defined for use with the logic diagram illustrated in FIGS. 23A and 23B are listed in the form of Boolean expression in the following table, TABLE 2:

| State: | Switch-on conditions: (Each Boolean expression is logically ANDed with the ON clock) | Switch-off conditions: (Each Boolean expression is logically ANDed with the ON Clock) |
|---|---|---|
| S1 | S6.N + S5.E.F' + S9.D.O' | S1.A + S1.P.A' = S1(A + P) |
| S2 | S1.A | S2.B |
| S3 | S2.B | S3.C |
| S4 | S3.C + S8.H.I'.R' | S4.G + S4.L.G' = S4(G + L) |
| S5 | S4.L.G' + S9.O | S5.F + S5.E.F' = S5(E + F) |
| S6 | S4.G + S7.Q.K' | S6.N + S6.J.N' = S6(J + N) |
| S7 | S6.J.N' + S8.R.I' | S7.Q.K' + S7.M.Q'.K' + S7.K = S7(M + Q + K) |
| S8 | S5.F + S7.K | S8.H.I'.R' + S8.R.I' + S8.I = S8(H + I + R) |
| S9 | S1.P.A' + S8.I + S7.M.Q'.K' | S9.D.O' + S9.O = S9(D + O) |

Referring to FIG. 23A and FIG. 23B, suppose, for illustration purposes, the state machine is in state S1 and input A is asserted. Then, the on signal 733 of SE2, which has the switch on condition of S1.A, will be logic "1". When there is ON clock pulse, the logic "1" will be passed through the NOR latch to the temporary state value TS2 752 of the D flip flop 723. At the same time, S1.A, the switch-off condition of SE1, will be satisfied at the off signal 732 of SE1. The off signal 732 will be logically ANDed with the enabling ON clock pulse, resetting the NOR latch, which sends a logic "0" to the temporary state value TS1 751 of the D flip flop 716. At the falling edge of the ON clock pulse, the temporary state value TS1 751 logic "0" is passed to present state value S1 701, making present state value S1 to be logic "0", while the temporary state value TS2 752, which is logic "1", will be passed to state value S2 702, making state value S2 702 logic "1". Accordingly, a state transition from state S1 to state S2, activated by the input A, is completed. All other state transitions illustrated in the state diagram of FIG. 22 operate in the logic diagram 700 of FIGS. 23A and 23B in similar way.

While the above-described embodiments of the present invention have been described with the use of synchronized input signals, embodiments of the present invention may also operate without the use of input synchronizers.

Figure 24A:
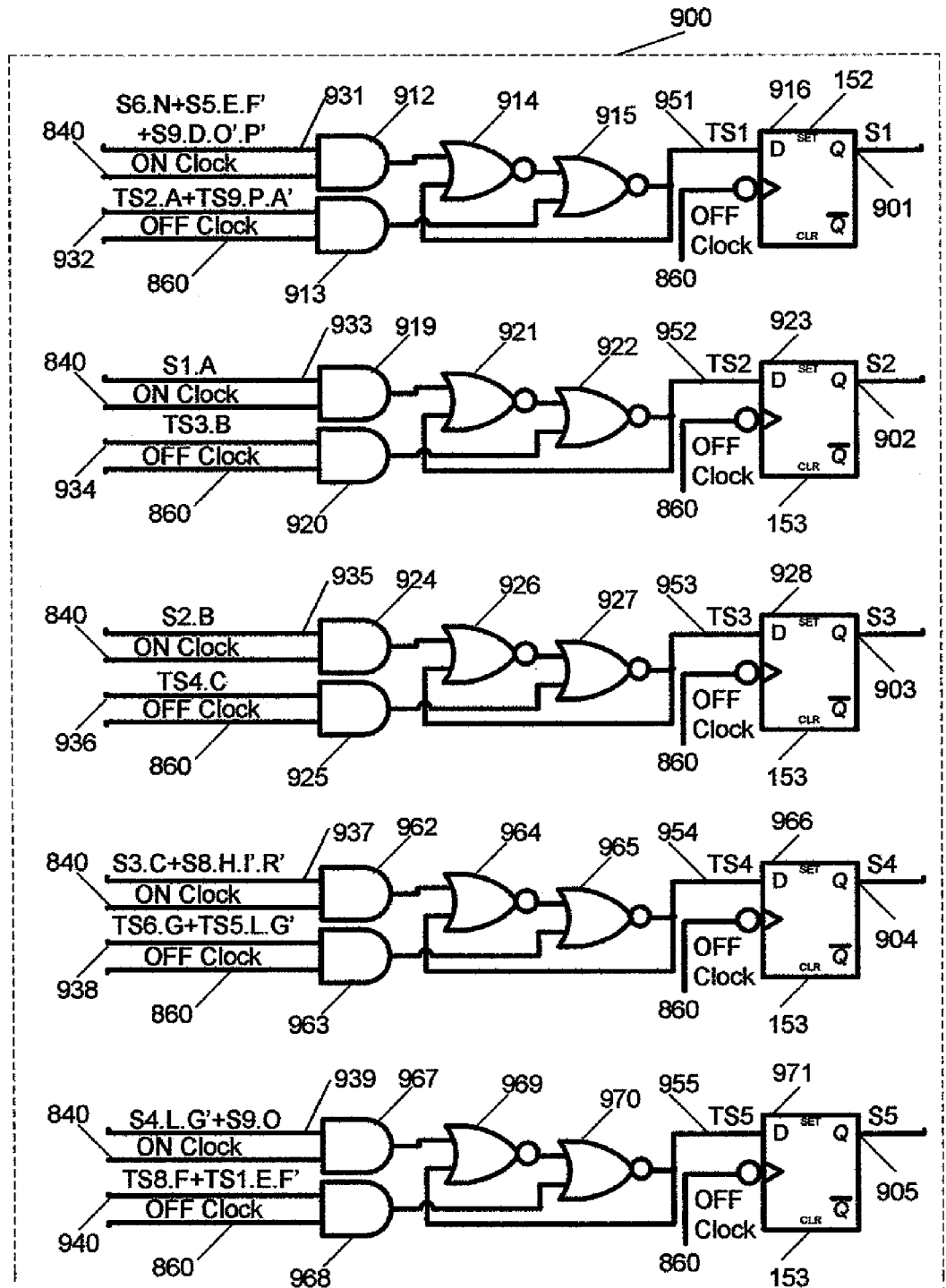
FIG. 24A is the first part of a logic diagram of the state machine illustrated in FIG. 19, using the third embodiment of the state element, shown in FIG. 13, in accordance with an embodiment of the present invention.
Figure 24B:
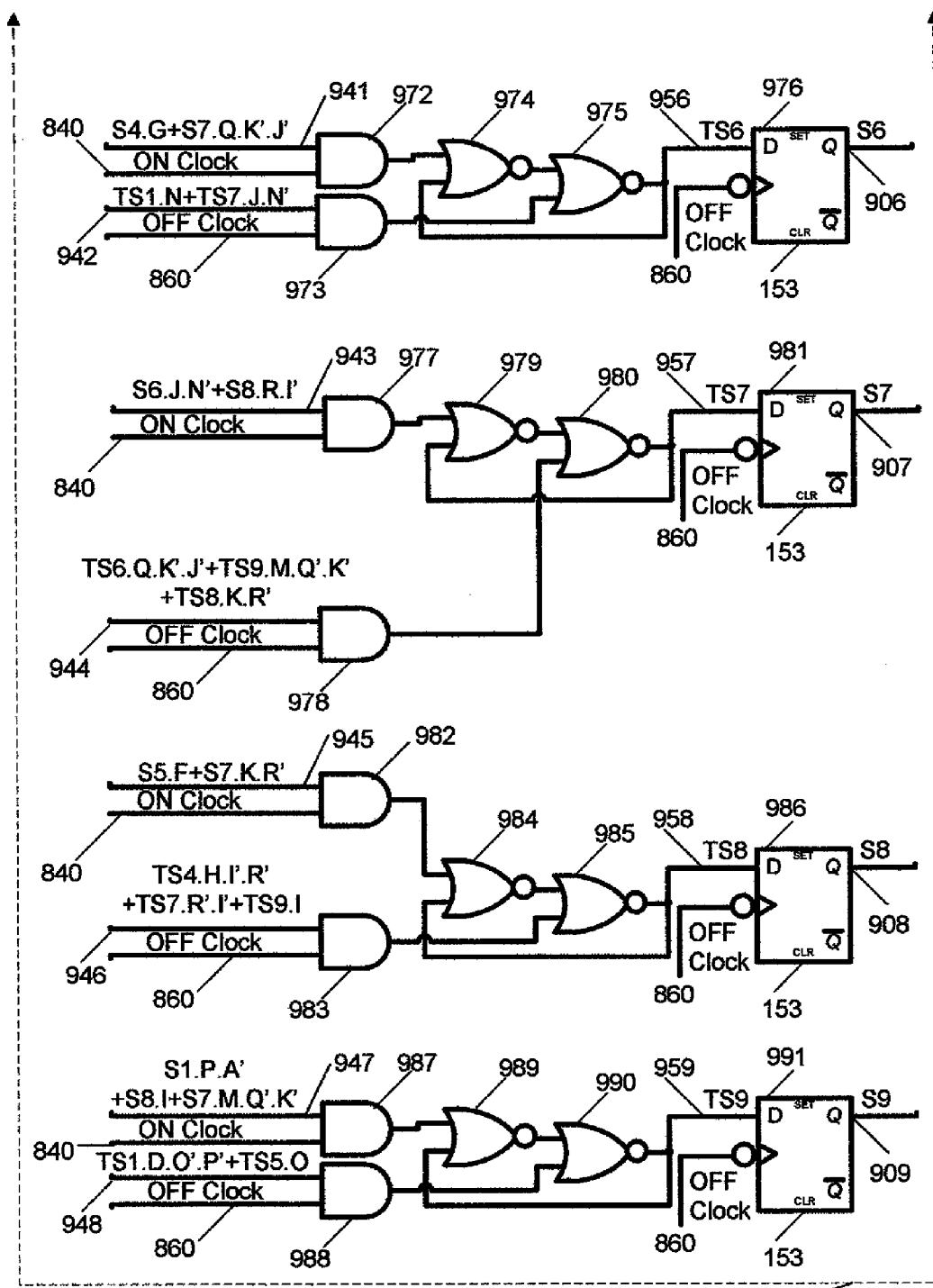
FIG. 24B is the second part of the logic diagram of the state machine illustrated in FIG. 19, using the third embodiment of the state element, shown in FIG. 13, in accordance with an embodiment of the present invention.

FIG. 24A is the first part of a logic diagram of the nine-state state machine illustrated in FIG. 19, which is continued on FIG. 24B, the second part of the logic diagram of the state machine illustrated in FIG. 19, in accordance with an embodiment of the present invention. The logic diagrams of FIGS. 24A and 24B correspond to the state machine illustrated by the state diagram of FIG. 19, using the third embodiment of the SE, which shown in FIG. 13.

In the illustrated logic diagram 900, SE1 includes a first AND gate 912, a second AND gate 913, a NOR latch constructed from a first NOR gate 914 and a second NOR gate 915, and a D flip flop 916; SE2 includes a first AND gate 919, a second AND gate 920, a NOR latch constructed from a first NOR gate 921 and a second NOR gate 922, and a D flip flop 923; SE3 includes a first AND gate 924, a second AND gate 925, a NOR latch constructed from a first NOR gate 926 and a second NOR gate 927, and a D flip flop 928; SE4 includes a first AND gate 962, a second AND gate 963, a NOR latch constructed from a first NOR gate 964 and a second NOR gate 965, and a D flip flop 966; SE5 includes a first AND gate 967, a second AND gate 968, a NOR latch constructed from a first NOR gate 969 and a second NOR gate 970, and a D flip flop 971; SE6 includes a first AND gate 972, a second AND gate 973, a NOR latch constructed from a first NOR gate 974 and a second NOR gate 975, and a D flip flop 976; SE7 includes a first AND gate 977, a second AND gate 978, a NOR latch constructed from a first NOR gate 979 and a second NOR gate 980, and a D flip flop 981; SE8 includes a first AND gate 982, a second AND gate 983, a NOR latch constructed from a first NOR gate 984 and a second NOR gate 985, and a D flip flop 986; and SE9 includes a first AND gate 987, a second AND gate 988, a NOR latch constructed from a first NOR gate 989 and a second NOR gate 990, and a D flip flop 991.

The switch-on and switch-off conditions defined for use with the logic diagram illustrated in FIGS. 24A and 24B are listed in the form of Boolean expressions in the following table, TABLE 3:

| State: | Switch-on conditions: (Each Boolean expression is logically ANDed with the ON clock) | Switch-off conditions: (Each Boolean expression is logically ANDed with the OFF clock) |
| --- | --- | --- |
| S1 | S6.N + S5.E.F'+ S9.D.O'.P' | TS2.A + TS9.P.A' |
| S2 | S1.A | TS3.B |
| S3 | S2.B | TS4.C |
| S4 | S3.C + S8.H.I'.R' | TS6.G + TS5.L.G' |
| S5 | S4.L.G' + S9.O | TS8.F + TS1.E.F' |
| S6 | S4.G + S7.Q.K'.J' | TS1.N + TS7.J.N' |
| S7 | S6.J.N' + S8.R.I' | TS6.Q.K'.J' + TS9.M.Q'.K' + TS8.K.R' |
| S8 | S5.F + S7.K.R' | TS4.H.I'.R' + TS7.R.I' + TS9.I |
| S9 | S1.P.A' + S8.I + S7.M.Q'.K' | TS1.D.O'.P' + TS5.O |

TABLE 3 includes conditions similar to those shown in TABLE 1, except that the switch-off conditions are considered with the OFF clock.

Using the switch-on and switch-off conditions listed in TABLE 3, an implementation of the state machine shown in FIG. 19, using the third embodiment of the SE, is illustrated in the logic diagram 900 of FIGS. 24A and 24B. The operation implementation of FIGS. 24A and 24B is similar to the implementation shown and described with reference to FIGS. 20A and 20B, except that the off signal are enabled by the OFF clock 860, which is also the master synchronizing signal whose falling edges synchronize the operation of the state machine.

In the embodiment illustrated in FIGS. 24A and 24B, the switch-on and switch-off conditions are the same as those used in the embodiment illustrated in FIGS. 20A and 20B, given in TABLE 1. However, the off signal of the logic diagram 900 of FIGS. 24A and 24B will be logically ANDed with the OFF clock for handling the metastability problem when raw signal inputs, without passing through inputs synchronizers, are used. An example operation is as follows: Initially, state value S1 901 is set to logic "1" by asserting S1 SET terminal 152, at the same time state value S2 902 is set to logic "0" by asserting S2 CLR terminal 153, other states' CLR terminals are also asserted so state values S2 902 through state value S9 909 are at logic "0". Then, the assertion is removed and the initialization is completed. For illustration purposes, while the state machine is in state S1, suppose that input A is asserted. Then, the on signal 933 of SE2 which has a switch-on condition of S1.A will be received as logic "1". When there is an ON clock pulse, a logic "1" will set the NOR latch output which is the temporary state value TS2 952 to logic "1". Then the temporary next state value TS2 952 will logically AND with the input A at the off signal 932 of SE1, which has the switch-off condition of TS2.A. When there is an OFF clock pulse, it will reset the NOR latch to make the temporary present state value TS1 951 to logic "0". At the next falling edge of the OFF clock 840, the temporary state value TS1 951 will be passed to state value S1 901, making present state value S1 logic "0". At the same falling edge of the OFF clock 840, the temporary state value TS2 is passed to state value S2 902, making next state value S2 logic "1", completing a state transition from state S1 to state S2, which was activated by the input A. Other state transitions work in similar way.

Since outputs of state machines are applications specific and may be derived from states or logical combinations of states, they are not mentioned and shown here for the purposes of clarity and simplicity.

The illustrated embodiments of logic diagrams implementing state machines may include other components that can equivalently perform the required logic functions. For example, while specific embodiments of the state element have been illustrated and described, other embodiments, and other components, may be used to implement embodiments of the present invention. For example, while a certain quantity of logic components and a certain quantity and type of flip-flops are illustrated, and coupled in a specified configuration, other equivalent and suitable types and quantities of components will be obvious to persons having ordinary skill in the art. For example, the falling edge triggered D flip flops may be replaced by other level clock enabled latches or level triggered flip flops, for example, when an independent third clock pulse, following the ON clock and OFF clock, is used as master synchronizing clock.

Also, the circuit logic diagrams and description of logical operations are provided for illustrative purposes and embodiments of the present invention may be implemented in other and different configurations using hardware, software, or firmware, or in any combination of hardware, software, and firmware. The logical operations and functionalities of the state elements, in accordance with embodiments of the present invention, can be implemented using various technologies and components including, but not limited to, discrete logic elements, such as AND gates, OR gates, NOT gates, latches, and flip flops, programmable logic devices (PLD), programmable array logic (PAL), programmable logic arrays (PLA), field programmable logic arrays (FPLA), field programmable gate arrays (FPGA), programmable read-only memory (PROM), erasable programmable read-only memory (EPROM), electrical erasable programmable read-only memory (EEPROM), ultraviolet erasable PROM (UV-PROM), complementary metal oxide semiconductor (CMOS), EECMOS, generic array logic (GAL), random access memory (RAM), flash memory, semiconductors, and any similar devices, or using technologies based on recombinant DNA, photonics, quantum mechanics, superconductivity, nano-mechanics, or other technologies utilizing various physical, chemical, or biological properties. The logic can be implemented in any suitable software languages, such as Verilog hardware description language, VHDL, or any other suitable commercially available or custom designed software packages.

It will also be appreciated that the logic diagrams illustrated and described herein may be considered partial logic diagrams in that, for clarity, certain signals, connections, or feedback loops may not be shown. For example, state value signals output from the various state elements may be looped back as input signals for the various state elements as necessary for the particular implementation. The illustrated embodiments of logic diagram may further be incorporated into state machine implementations as desired. Also, certain signals and components may be redundant but included for the sake of clarity of symmetry.

Those skilled in the art will appreciate that the above-described system may be implemented in a variety of configurations. For example, while certain configurations have been described, it will be appreciated that other configurations may be implemented without departing from the scope of the invention. Also, while the various above-described components have been described as having certain criteria, other suitable components may be used.

The previous description of the exemplary embodiments is provided to enable any person skilled in the art to make and/or use the present invention. While the invention has been described with respect to particular illustrated embodiments, various modifications to these embodiments will readily be apparent to those skilled in the art, and the generic principles defined herein may be applied to other embodiments without departing from the spirit or scope of the invention. It is therefore desired that the present embodiments be considered in all respects as illustrative and not restrictive. Accordingly, the present invention is not intended to be limited to the embodiments described above but is to be accorded the widest scope consistent with the principles and novel features disclosed herein.

What is claimed is:

1. A system for implementing a state machine including a plurality of states, the state machine configured to transition from a present state to a next state in response to input, the system comprising:

a plurality of state elements, each of the plurality of state elements representing one of the plurality of states of the state machine, each of the plurality of state elements receiving an on signal, an off signal, and a synchronizing signal, each of the state elements outputting a state value, each of the plurality of state elements further including a logic element to store a temporary state value, wherein the state value is updated by the temporary state value in response to the synchronizing signal; and wherein the state value of a first one of the plurality of state elements is true, and wherein the one of the plurality of state elements having a true state value is a present state element, and wherein a second one of the plurality of state elements is a next state element, and the state value of the next state element is false, and wherein the present state element corresponds to the present state of the state machine, and the next state element corresponds to the next state of the state machine, and wherein the state value of the next state element changes from false to true in response to an assertion of the on signal of the next state element, and wherein the state value of the present state element changes from true to false in response to an assertion of the off signal of the present state element; and wherein the state value of each of the plurality of state elements is synchronously updated in response to the synchronizing signal.

2. The system of claim 1, wherein the logic element includes a latch.

3. The system of claim 1, wherein each of the plurality of state elements further receives an on enable signal, and the on signal is enabled by the on enable signal.

4. The system of claim 1, wherein each of the plurality of state elements further receives an off enable signal, and the off signal is enabled by the off enable signal.

5. The system of claim 1, wherein the on signal includes a combination of at least the state value of the present state element and one or more inputs associated with the next state element; and wherein the off signal includes a combination of at least the temporary state value of the next state element and the one or more inputs associated with the next state element.

6. The system of claim 1, wherein the on signal includes a combination of at least the state value of the present state element and one or more inputs associated with the next state element; and wherein the off signal includes a combination of at least the state value of the present state element and the one or more inputs associated with the next state element.

7. The system of claim 1, wherein the on signal represents one or more boolean expressions, wherein at least one of the one or more boolean expressions includes a combination of the state value of the present state element and one or more inputs associated with the next state element, and wherein the on signal of the next state element is true when at least one of the one or more boolean expressions is true; and wherein the off signal represents one or more boolean expressions, wherein at least one of the one or more boolean expressions includes a combination of the temporary state value of the next state element and the one or more inputs associated with the next state element, and wherein the off signal of the present state element is true when at least one of the one or more boolean expressions is true.

8. The system of claim 1, wherein the on signal represents one or more boolean expressions, wherein at least one of the one or more boolean expressions includes a combination of the state value of the present state element and one or more inputs associated with the next state element, and wherein the on signal of the next state element is true when at least one of the one or more boolean expressions is true; and wherein the off signal represents one or more boolean expressions, wherein at least one of the one or more boolean expressions includes a combination of the state value of the present state element and the one or more inputs associated with the next state element, and wherein the off signal of the present state element is true when at least one of the one or more boolean expressions is true.

9. The system of claim 1, wherein the on signal of each of the plurality of state elements corresponds to one or more on conditions, and wherein the on signal is true when at least one of the one or more on conditions is true, and wherein the off signal corresponds to one or more off conditions, and wherein the off signal is true when at least one of the one or more off conditions is true; and wherein the one or more on conditions include a first logical combination of at least one predetermined input and at least one predetermined state value, and wherein the one or more off conditions include a second logical combination of at least one predetermined input and at least one predetermined state value.

10. The system of claim 1, wherein the on signal of each of the plurality of state elements corresponds to one or more on conditions, and wherein the on signal is true when at least one of the one or more on conditions is true, and wherein the off signal corresponds to one or more off conditions, and wherein the off signal is true when at least one of the one or more off conditions is true;

wherein the one or more on conditions include a first logical combination of at least one predetermined input and at least one predetermined state value, and wherein the one or more off conditions include a second logical combination of at least one predetermined input and at least one predetermined temporary state value.

11. The system of claim 9, wherein the one or more on conditions and the one or more off conditions of each state element correspond to transitions between the states of the state machine, and wherein the one or more on conditions and the one or more off conditions are defined according to the desired state transitions.

12. The system of claim 1, wherein each of the plurality of state elements further includes a storage element coupled to the logic element, wherein the logic element receives the on signal and the off signal, and the storage element receives the synchronizing signal.

13. The system of claim 12, wherein the logic element is configured to set and reset the temporary state value in response to a change in at least one of the on signal and the off signal.

14. The system of claim 13, wherein the temporary state value is set to true when the on signal is true and the temporary state value is reset to false when the off signal is true.

15. The system of claim 12, wherein the logic element further receives an on enable signal, and the on signal is enabled by the on enable signal.

16. The system of claim 15, wherein the synchronizing signal follows the on enable signal.

17. The system of claim 15, wherein the on enable signal is the synchronizing signal.

18. The system of claim 15, wherein the logic element further receives an off enable signal, and the off signal is enabled by the off enable signal.

19. The system of claim 18, wherein the off enable signal follows the on enable signal, and the synchronizing signal follows the off enable signal.

20. The system of claim 18, wherein the on enable signal is also the off enable signal.

21. The system of claim 18, wherein the off enable signal is also the synchronizing signal.

22. The system of claim 18, wherein the off enable signal is always on.

23. The system of claim 1, wherein the logic element includes a first logic element, a second logic element coupled to the first logic element, and a storage element coupled to the second logic element, wherein the first logic element receives the on signal and the off signal, and wherein the first logic element further receives an on enable signal and the on signal is enabled by the on enable signal, and wherein the first logic element further receives an off enable signal and the off signal is enabled by the off enable signal, and the storage element receives the synchronizing signal.

24. The system of claim 23, wherein the first logic element includes a first AND gate, the second logic element includes a latch and the latch is a NOR latch including a first NOR gate and a second NOR gate, and the storage element is a D flip flop, wherein the first AND gate receives the on signal and the on enable signal, and wherein the first logic element transmits a set signal and a reset signal to the second logic element, and the second logic element transmits the temporary state signal to the D flip flop.

25. The system of claim 23, wherein the first logic element includes a first NAND gate and a second NAND gate, the second logic element includes the latch and the latch is a NAND latch including a first NAND gate and a second NAND gate, and the storage element is a D flip flop, wherein the first NAND gate receives the on signal and the on enable signal, and the second NAND gate receives the off signal and the off enable signal, and wherein the first logic element transmits a set signal and a reset signal to the second logic element, and the second logic element transmits the temporary state signal to the D flip flop.

26. The system of claim 24, wherein the on enable signal is the synchronizing signal.

27. The system of claim 24, wherein the first logic element further includes a second AND gate, and the second AND gate receives the off signal and an off enable signal.

28. The system of claim 27, wherein the on enable signal is also the off enable signal.

29. The system of claim 27, wherein the off enable signal is also the synchronizing signal.

30. The system of claim 27, wherein the off enable signal is always on.

31. A system for implementing a state machine including a plurality of states, the state machine configured to transition from a present state to a next state in response to input, the system comprising:

a plurality of state elements, each of the plurality of state elements representing one of the plurality of states of the state machine, each of the plurality of state elements receiving an on signal, an on enable signal, an off signal, an off enable signal, and a synchronizing signal, each of the state elements outputting a state value, each of the plurality of state elements further including a latch to store and output a temporary state value, wherein the state value is updated by the temporary state value in response to the synchronizing signal; and wherein the state value of a first one of the plurality of state elements is true, and wherein the one of the plurality of state elements having a true value is a present state element, and wherein a second one of the plurality of state elements is a next state element, and the state value of the next state element is false, and wherein the present state element corresponds to the present state of the state machine, and the next state element corresponds to the next state of the state machine, and wherein the latch of the next state element is set in response to the state value of the present state element, one or more inputs, and an assertion of the on enable signal; and wherein the state value of the next state element is updated by the latch output of the next state element in response to the synchronizing signal.

32. The system of claim 31, wherein the latch of the present state element is reset in response to the latch output of the next state element, the one or more inputs, and an assertion of the off enable signal; wherein the state value of the present state element is updated by the latch output of the present state element in response to the synchronizing signal, and wherein the synchronizing signal is the on enable signal, and wherein the off enable signal is always on.

33. The system of claim 31, wherein the latch of the present state element is reset in response to the state value of the present state element, the one or more inputs, and an assertion of the off enable signal; and wherein the state value of the present state element is updated by the latch output of the present state element in response to the synchronizing signal, and wherein the synchronizing signal is the on enable signal, and wherein the synchronizing signal is also the off enable signal.

34. The system of claim 31, wherein the latch of the present state element is reset in response to the latch output of the next state element, the one or more inputs, and an assertion of the off enable signal; wherein the state value of the present state element is updated by the latch output of the present state element in response to the synchronizing signal; and wherein the synchronizing signal and the off enable signal are an off clock, and the on enable signal is an on clock.

35. A system for implementing a state machine including a plurality of states, the state machine configured to transition from a present state to a next state in response to input, the system comprising:

a plurality of state elements, each of the plurality of state elements including at least one logic element and a storage element coupled to the at least one logic element, the storage element receives a synchronizing signal, the storage element configured to store and output a state value of the state element, wherein each of the plurality of state elements represents one of the plurality of states of the state machine;

wherein the at least one logic element of each of the plurality of state elements receives an on signal, an off signal, and an on enable signal, and wherein the state value selectively alternates between an ON value and an OFF value in response to the input, and wherein the ON value indicates an active state element and the OFF value indicates an inactive state of the state element;

wherein a first one of the plurality of state elements is active and represents a present state element and wherein a second one of the plurality of state elements is inactive and represents a next state;

wherein the present state element corresponds to the present state of the state machine, wherein the next state element corresponds to the next state of the state machine; and wherein the on signal represents one or more on conditions for the associated state element, the one or more on conditions including a first logic combination including at least a state value of one of the plurality of state elements, one or more predetermined inputs, and the on enable signal.

36. The system of claim 35, wherein the at least one logic element of each of the plurality of state elements further receives an off enable signal, and the off signal represents one or more off conditions for the associated state element, the one or more off conditions including a second logical combination including at least a state value of one of the plurality of state elements, the one or more predetermined inputs, and the off enable signal.

37. The system of claim 35, wherein the at least one logic element of each of the plurality of state elements further receives an off enable signal, and the off signal represents one or more off conditions for the associated state element, the one or more off conditions including a second logical combination including at least a temporary state value of one of the plurality of state elements, the one or more predetermined inputs, and the off enable signal.

38. A system for implementing a state machine including a plurality of states, the state machine configured to transition from a present state to a next state in response to input, the system comprising:

a plurality of state elements, each of the plurality of state elements representing one of the plurality of states of the state machine, and each of the state elements outputs a state value, each of the state elements including:

a logic element, wherein the logic element receives an on signal, an on enable signal, an off signal, and an off enable signal, wherein the logic element latches and outputs a temporary state value; and a storage element coupled to the logic element, the storage element stores and outputs a state value, wherein the storage element receives the temporary state value from the logic element, and wherein the storage element receives a synchronizing signal having a periodic oscillating pulse having an successive plurality of rising edges and falling edges, and wherein the state value output of the storage element updates to the temporary state value at every falling edge of the synchronizing signal; and wherein one of the plurality of state elements is a present state element corresponding to the present state of the state machine, and one of the plurality of state elements is a next state element corresponding to the next state of the state machine, wherein the state value of the present state element is set to off upon receiving one or more predetermined inputs and the off enable signal of the present state element is asserted, and wherein the state value of the next state element is set to on upon receiving the one or more predetermined inputs and the on enable signal of the next state element is asserted.

39. The system of claim 38, wherein the state value of the present state element is set to off and the state value of the next state element is set to on upon subsequent update of each of the plurality of state element by the synchronizing signal.

40. The system of claim 38, wherein the on signal represents one or more on conditions for the associated state element, the one or more on conditions including a first logic combination including the one or more predetermined inputs and at least a state value of one of the plurality of state elements, and the off signal represents one or more off conditions, the one or more off conditions including a second logical combination of the one or more predetermined inputs and at least one predetermined state value.

41. The system of claim 38, wherein the on signal represents one or more on conditions for the associated state element, the one or more on conditions including a first logic combination including the one or more predetermined inputs and at least a state value of one of the plurality of state elements, and the off signal represents one or more off conditions, the one or more off conditions including a second logical combination of the one or more predetermined inputs and at least one predetermined temporary state value.

42. A state element logic system for implementing a state machine including a plurality of states, the state element logic system representing one of the plurality of states of the state machine, the state element logic system comprising:
   a logic element, wherein the logic element receives an on signal, an on enable signal, an off signal, and an off enable signal, wherein the logic element latches and outputs a temporary state value; and
   a storage element coupled to the logic element, the storage element stores and outputs a state value, wherein the storage element receives the temporary state value from the logic element, and wherein the storage element receives a synchronizing signal having a periodic oscillating pulse having an successive plurality of rising edges and falling edges, and wherein the state value output of the storage element updates to the temporary state value at every falling edge of the synchronizing signal, and wherein a change in the state value of the storage element to off is triggered when the off signal is true and the off signal is enabled by the off enable signal, and a change in the state value of the storage element to on is triggered when the on signal is true and the on signal is enabled by the on enable signal.

43. A logic device for implementing a state machine including a plurality of states, the state machine configured to transition from a present state to a next state in response to input, the logic device comprising:
   a plurality of logic elements for representing the plurality of states of the state machine, each of the plurality of logic elements including a first combinational logic input and a second combinational logic input, wherein the first combinational logic input is an on signal and the second combinational logic input is an off signal, each of the plurality of logic elements further including a storage element that outputs a state value signal and receives a temporary state value signal and a synchronizing signal, wherein the state value signal updates in response to the synchronizing signal; and
   wherein the state value signal of a first one of the plurality of logic elements is true, and wherein the one of the plurality of logic elements having a true state value signal is a present state logic element, and wherein a second one of the plurality of logic elements is a next state logic element and the state value signal of the next state logic element is false; and
   wherein a transition from a present state of the state machine to a next state of the state machine occurs when the state value signal of the present state logic element updates from true to false in response to input satisfying the second combinational logic input of the present state logic element, and the state value signal of the next state logic element updates from false to true in response to input satisfying the first combinational logic input of the next state logic element.

44. A system for implementing a state machine including a plurality of states, the state machine configured to transition from a present state to a next state, the system comprising:
   means for representing a plurality of states of the state machine;
   means for representing transition conditions, wherein each of the plurality of states is associated with means for representing on transition conditions and means for representing off transition conditions;
   means for identifying an active state as a present state of the state machine and a plurality of inactive states of the state machine, wherein one of the plurality of inactive states is a next state of the state machine, and the state machine transitions from the present state to the next state in response to input means satisfying one or more of the transition conditions; and
   synchronizing means for transitioning from the present state of the state machine to the next state of the state machine in response to input means satisfying one or more of the transition conditions.

45. The system of claim 10, wherein the one or more on conditions and the one or more off conditions of each state element correspond to transitions between the states of the state machine, and wherein the one or more on conditions and the one or more off conditions are defined according to the desired state transitions.

* * * * *